(12) United States Patent
Baker

(10) Patent No.: US 7,748,219 B2
(45) Date of Patent: Jul. 6, 2010

(54) METHOD AND APPARATUS TO CONVERT LOW TEMPERATURE THERMAL ENERGY TO ELECTRICITY

(75) Inventor: David M. Baker, Mosinee, WI (US)

(73) Assignee: PDM Solar, Inc., Wausau, WI (US)

( * ) Notice: Subject to any disclaimer, the term of this patent is extended or adjusted under 35 U.S.C. 154(b) by 777 days.

(21) Appl. No.: 11/387,405

(22) Filed: Mar. 23, 2006

(65) Prior Publication Data

US 2006/0213502 A1  Sep. 28, 2006

Related U.S. Application Data

(60) Provisional application No. 60/664,480, filed on Mar. 23, 2005.

(51) Int. Cl.
F03G 7/00 (2006.01)
(52) U.S. Cl. .................................. 60/641.2; 60/641.15
(58) Field of Classification Search ................ 60/641.2, 60/641.8, 641.15
See application file for complete search history.

(56) References Cited

U.S. PATENT DOCUMENTS

| | | | |
|---|---|---|---|
| 231,007 A | 8/1880 | Catlin |
| 336,224 A | 2/1886 | Fevort |
| 439,110 A | 10/1890 | Chaffey |
| 599,831 A | 3/1898 | Cohen |
| 636,643 A | 11/1899 | Donnelly |
| 694,885 A | 3/1902 | O'Connell |
| 719,127 A | 1/1903 | Myers |
| 722,968 A | 3/1903 | Gastal |
| 766,017 A | 7/1904 | Carlier |
| 836,624 A | 11/1906 | Berg |
| 848,775 A | 4/1907 | Selakosky |
| 960,729 A | 6/1910 | Sweeny |
| 1,011,226 A | 12/1911 | Miller |
| 1,044,583 A | 11/1912 | Selakosky |
| 1,101,000 A | 6/1914 | Willsie |
| 1,130,870 A | 3/1915 | Willsie |
| 1,228,444 A | 6/1917 | Humphrey |
| 1,231,971 A | 7/1917 | Trump |
| 1,254,693 A | 1/1918 | Humphrey |
| 1,257,004 A | 2/1918 | Humphrey |
| 1,257,607 A | 2/1918 | Humphrey |
| 1,271,712 A | 7/1918 | Humphrey et al. |
| 1,406,556 A | 2/1922 | Haven |

(Continued)

FOREIGN PATENT DOCUMENTS

WO  PCT/GB2006000412  8/2006

*Primary Examiner*—Hoang M Nguyen
(74) *Attorney, Agent, or Firm*—Lane Patents LLC

(57) ABSTRACT

Methods and systems are disclosed to convert low temperature thermal energy to electricity. An example apparatus disclosed herein includes an electrical generating unit to receive heat energy to produce electricity, a concentrator including a heat engine, a liquid piston operatively coupled to the heat engine, and a heat pump operatively coupled to the liquid piston, the heat engine adapted to collect thermal energy, and the heat pump operatively coupled to the electrical generating unit to provide heat to the electrical generating unit. The example apparatus disclosed herein also includes a heat engine floating piston disposed in the heat engine, a heat pump floating piston disposed in the heat pump, and wherein the heat engine floating piston and the heat pump floating piston oscillate.

22 Claims, 20 Drawing Sheets

U.S. PATENT DOCUMENTS

| | | | |
|---|---|---|---|
| 1,678,612 A | 7/1928 | Walker | |
| 1,766,998 A | 6/1930 | Jacocks | |
| 1,785,651 A | 12/1930 | Romagnoli | |
| 1,902,961 A | 3/1933 | La Bour | |
| 2,384,247 A | 9/1945 | Gay | |
| 2,547,111 A | 4/1951 | Cawley et al. | |
| 2,549,620 A | 4/1951 | Mitchell | |
| 2,862,653 A | 12/1958 | Shapiro | |
| 3,602,612 A | 8/1971 | Osdor | |
| 3,699,779 A | 10/1972 | Schlichtig | |
| 3,788,092 A | 1/1974 | Miller | |
| 3,823,573 A | 7/1974 | Cassady | |
| 3,988,901 A | 11/1976 | Shelton et al. | |
| 3,995,429 A | 12/1976 | Peters | |
| 4,009,587 A | 3/1977 | Robinson, Jr. et al. | |
| 4,030,303 A | 6/1977 | Kraus et al. | |
| 4,084,408 A | 4/1978 | von Platen | |
| 4,087,974 A | 5/1978 | Vaughan | |
| 4,093,868 A | 6/1978 | Manning | |
| 4,120,160 A | 10/1978 | Davis | |
| 4,148,195 A * | 4/1979 | Gerstmann et al. | 62/6 |
| 4,170,116 A | 10/1979 | Williams | |
| 4,195,481 A | 4/1980 | Gregory | |
| 4,209,982 A | 7/1980 | Pitts | |
| 4,211,207 A | 7/1980 | Molivadas | |
| 4,240,260 A | 12/1980 | Gustafson | |
| 4,292,809 A | 10/1981 | Björklund | |
| 4,347,703 A | 9/1982 | Lukasavage | |
| 4,355,517 A | 10/1982 | Ceperley | |
| 4,358,929 A | 11/1982 | Molivadas | |
| 4,394,814 A | 7/1983 | Wardman et al. | |
| 4,409,961 A | 10/1983 | O'Hare | |
| 4,418,547 A | 12/1983 | Clark, Jr. | |
| 4,438,730 A | 3/1984 | Link et al. | |
| 4,446,700 A | 5/1984 | Bronicki et al. | |
| 4,455,826 A | 6/1984 | Knoos | |
| 4,462,343 A | 7/1984 | Eckert | |
| 4,474,025 A | 10/1984 | Alefeld | |
| 4,479,354 A | 10/1984 | Cosby | |
| 4,493,292 A | 1/1985 | Showalter | |
| 4,501,122 A | 2/1985 | Cutler | |
| 4,514,979 A | 5/1985 | Mohr | |
| 4,537,036 A | 8/1985 | Clark, III | |
| 4,537,037 A | 8/1985 | Clark, Jr. | |
| 4,565,161 A | 1/1986 | Choquette | |
| 4,566,860 A | 1/1986 | Cowan | |
| 4,612,782 A | 9/1986 | Urch | |
| 4,617,801 A | 10/1986 | Clark, Jr. | |
| 4,638,642 A | 1/1987 | Tokuno | |
| 4,666,376 A | 5/1987 | Solomon | |
| 4,693,090 A | 9/1987 | Blackman | |
| 4,745,749 A | 5/1988 | Benson | |
| 4,779,427 A | 10/1988 | Rowley et al. | |
| 4,816,121 A * | 3/1989 | Keefer | 204/156 |
| 5,073,090 A | 12/1991 | Cassidy | |
| 5,129,236 A | 7/1992 | Solomon | |
| 5,214,921 A | 6/1993 | Cooley | |
| 5,275,014 A | 1/1994 | Solomon | |
| 5,313,874 A | 5/1994 | Lackstrom | |
| 5,412,950 A | 5/1995 | Hu | |
| 5,775,107 A | 7/1998 | Sparkman | |
| 5,924,287 A | 7/1999 | Best | |
| 5,934,076 A * | 8/1999 | Coney | 60/617 |
| 5,953,917 A | 9/1999 | Murphy et al. | |
| 6,028,375 A | 2/2000 | Kishi | |
| 6,374,614 B2 | 4/2002 | Prueitt | |
| 6,412,281 B2 | 7/2002 | Cover | |
| 6,474,058 B1 | 11/2002 | Warren | |
| 6,484,501 B1 | 11/2002 | Mieth et al. | |
| 6,739,139 B1 | 5/2004 | Solomon | |
| 6,931,852 B2 | 8/2005 | Yatsuzuka et al. | |
| 7,019,412 B2 | 3/2006 | Ruggieri et al. | |
| 7,073,331 B2 | 7/2006 | Oda et al. | |
| 7,185,491 B2 | 3/2007 | Oda | |
| 7,246,492 B2 | 7/2007 | Hendrix | |
| 2002/0170292 A1 | 11/2002 | Awad | |
| 2004/0168437 A1 | 9/2004 | Haq | |
| 2005/0198959 A1 | 9/2005 | Schubert | |
| 2005/0257525 A1 | 11/2005 | Komaki et al. | |
| 2006/0048510 A1* | 3/2006 | White et al. | 60/520 |
| 2006/0112691 A1 | 6/2006 | Ou | |

* cited by examiner ial application claiming
METHOD AND APPARATUS TO CONVERT LOW TEMPERATURE THERMAL ENERGY TO ELECTRICITY

CROSS REFERENCE TO RELATED APPLICATION

This application is a non-provisional application claiming priority from U.S. Provisional Application Ser. No. 60/664,480, filed Mar. 23, 2005, entitled "Utility Scale Method and Apparatus to Convert Low Temperature Thermal Energy to Electricity" and incorporated herein by reference in its entirety.

FIELD OF THE INVENTION

The present invention is directed toward a thermal concentrator inputting low grade thermal energy and outputting useful energy. More specifically converting heat from solar power into electricity, mechanical work and the like.

BACKGROUND

Three major technologies are currently being used for concentrating solar power generation to produce useful work; the parabolic trough, the power tower, and the sterling dish. The costs of generating electricity from these power sources are high. All three require a high working temperature, which creates problems with maintenance and seal failure rates. With these technologies, the solar radiation is concentrated at the time of collection requiring a high working temperature at the point of collection. This higher temperature generally leads to higher thermal losses, which typically forces the use of more expensive and complicated collectors and thermal storage units. This constraint leads to higher costs for construction of these devices.

DESCRIPTION

The present system utilizes a dual loop U, partial square, or other suitably shaped heat actuated liquid piston heat pump, where one vertical leg contains part of a heat engine loop and the other vertical leg contains part of a heat pump loop. Persons of ordinary skill in the art will appreciate that the heat pump described herein is sometimes referred to as a compressor. The top of the vertical legs contain steam. The bottom of each vertical leg and the horizontal portion contains liquid water, on top of which is typically a floating piston usually constructed from a solid material, such as, for example, aluminum or steel.

The system operates at or near resonance. The resonance occurs between the kinetic energy of the mass of the liquid water and pistons, the potential energy due to gravity or hydraulic head, and the potential energy stored in the steam at the top of each vertical leg. Among other advantages, resonance allows the steam to enter the heat engine with little or no throttling.

The heat engine section operates using a thermodynamic cycle and draws the heat energy from a natural or waste heat source, typically from solar energy. Fluid, typically water, in the liquid or steam form, is transferred between the solar collectors and the heat engine as part of the heat engine loop.

The heat pump loop contains the heat pump described above and a steam turbine, which is connected to and drives an electrical generator. Water, in the form of superheated steam, is transferred from the output of the heat pump, to the inlet of the steam turbine, through the steam turbine, and from the steam turbine exhaust back to the inlet of the heat pump.

Steam and liquid water reservoirs are typically used between the solar collectors and the heat engine. Steam reservoirs are also typically used between the heat pump and steam turbine to even the flow of steam from the reciprocating heat actuated liquid piston heat pump.

Both of the loops may operate at or below atmospheric pressure. This feature, in combination with placement of the heat actuated liquid piston heat pump below grade, may allow the use of low cost materials, such as concrete.

While the equipment and method described herein to generate electricity are described in terms of solar power, it could be used with other sources of heat. For example, the system could be used with low grade heat from a geothermal source. It is preferred that the heat is available at a temperature of at least 60 C. higher than the ambient temperature. The method can be used with a temperature differential lower than this, but possibly at a reduced efficiency.

Figure 1A:
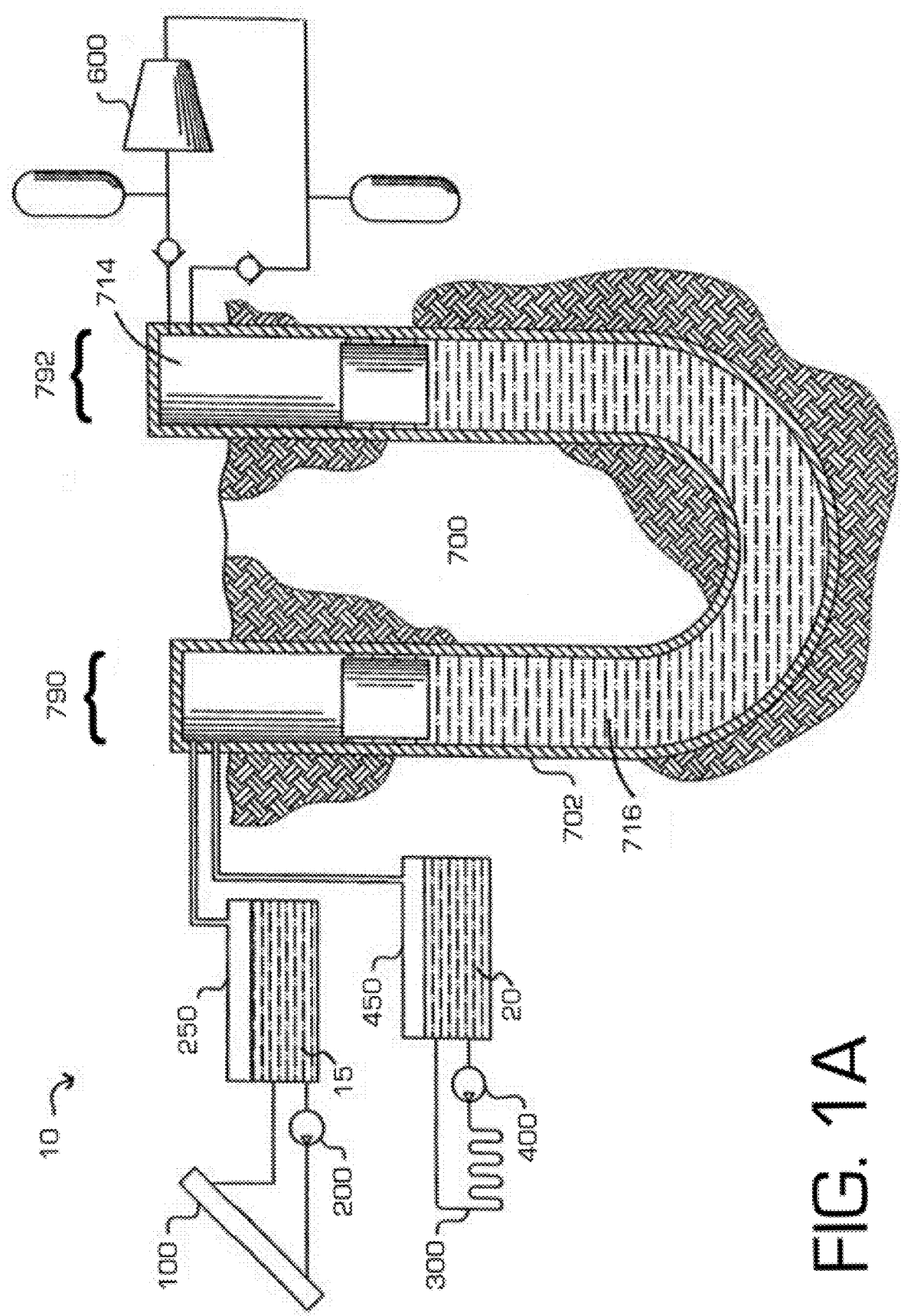
FIG. 1A is an exemplary layout of a concentrator system.
Figure 1B:
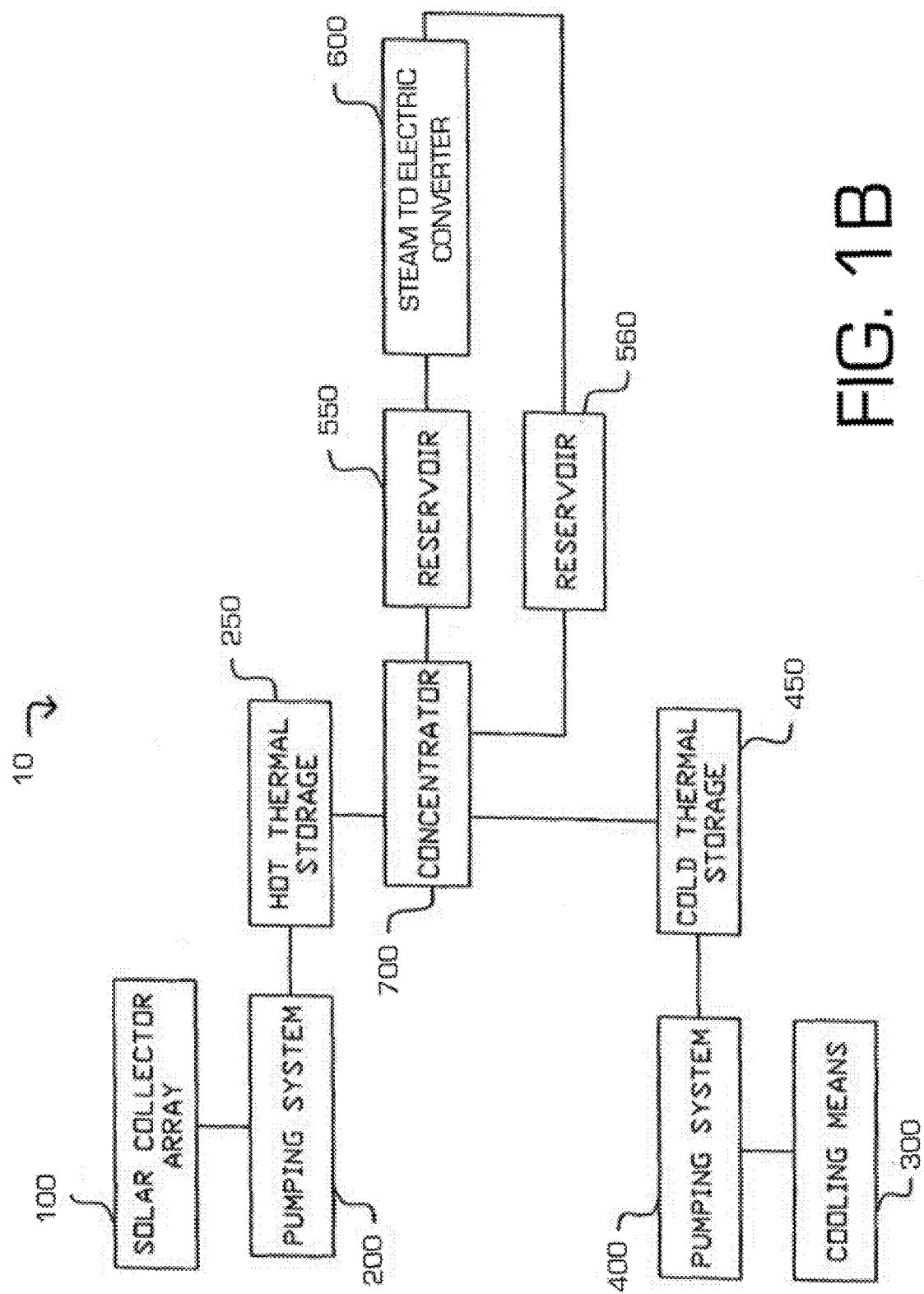
FIG. 1B is an exemplary schematic block diagram of the system of FIG. 1A.
Figure 2:
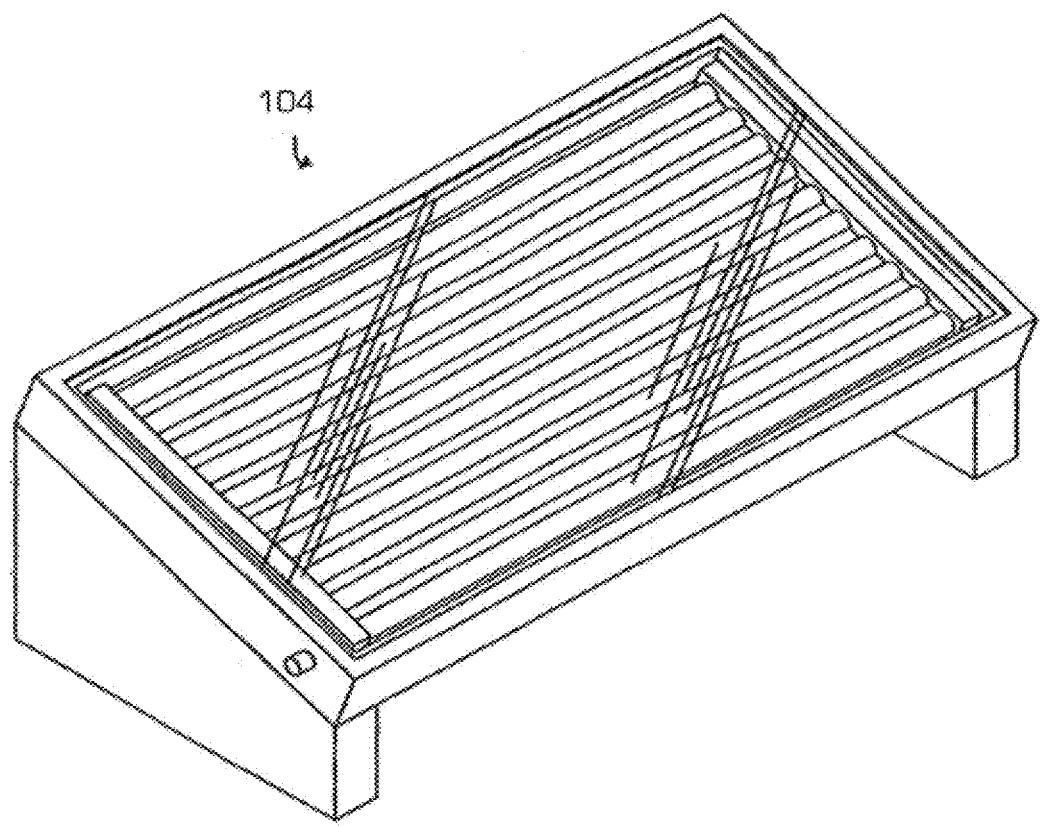
FIG. 2 is a perspective view of one embodiment of a heating device. In this example a solar collector.
Figure 3:
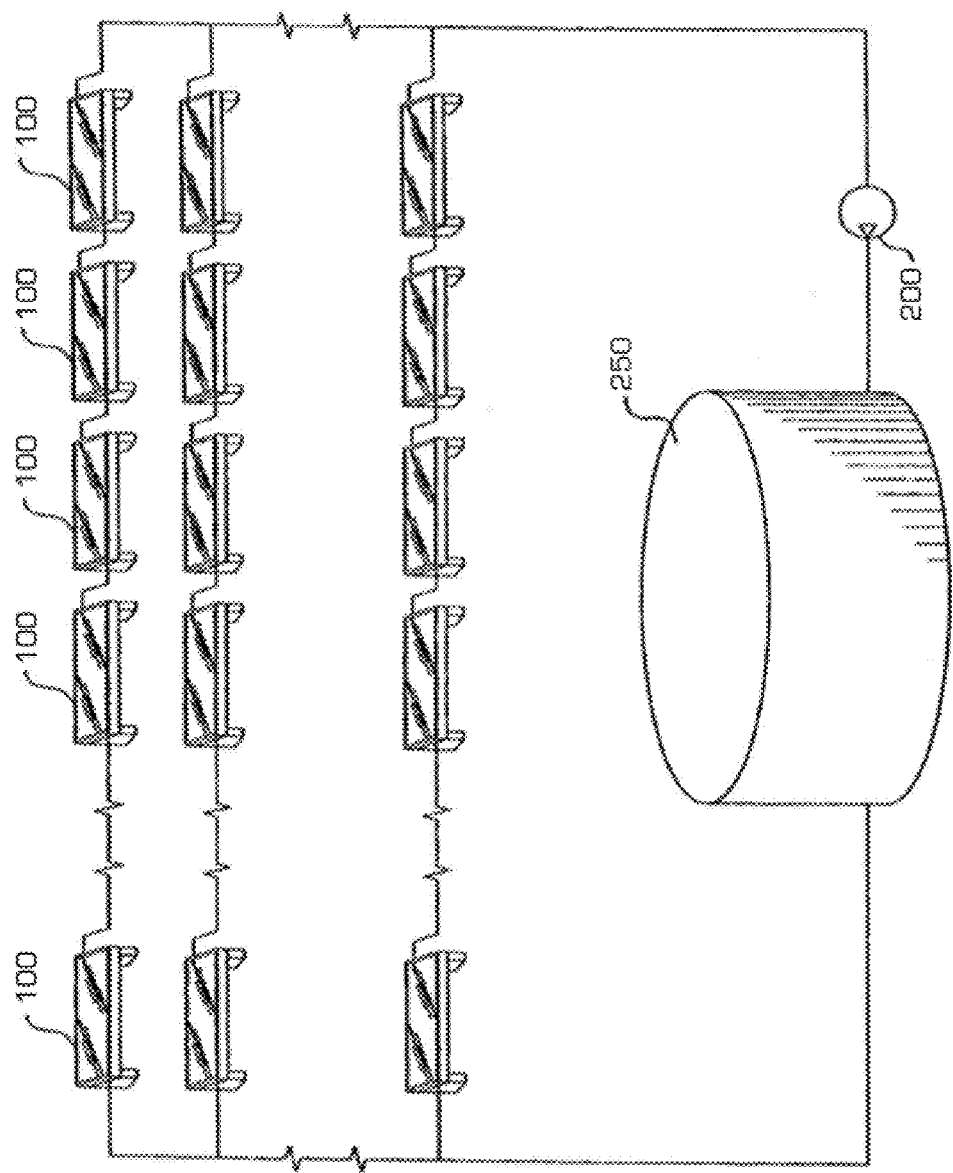
FIG. 3 is a schematic view of an array of solar collectors connected to a thermal reservoir.

FIG. 1A is an exemplary embodiment of a system 10 that generates electricity using a hot and a cold source. FIG. 1B is an exemplary schematic block diagram of the system 10. The system 10 utilizes a heating device 100 that heats a fluid 15, which is then pumped by a hot pumping device 200 to a hot thermal storage device 250. The system 10 also utilizes a cooling device 300 that cools a fluid 20 of the same material as the heating fluid 15, which is pumped by a cold pumping system 400 into a cold thermal storage device 450 after it is cooled.

This embodiment utilizes two thermal storage systems (hot and cold) 250, 450, but alternative systems which use multiple thermal storage systems or no thermal storage systems can also be used. This embodiment uses solar as the heat source. Because solar energy is intermittent, the system may work more efficiently if thermal storage is utilized.

If a continuous heat source, such as geothermal or industrial waste heat is utilized, the thermal storage system 250 may be eliminated.

The fluid 15 from hot thermal storage device 250 is transferred to concentrator 700 and the cold fluid 20 from cold thermal storage device 450 is used to transfer heat from the concentrator 700, which cools the concentrator 700. The cold fluid 20 from the concentrator 700 may also be transferred to the cold thermal storage device 450.

The concentrator 700 heats a fluid 714 to a higher temperature than that of the fluid 15 stored in the hot thermal storage device 250. This high temperature fluid 714 is then transferred into an electric converter 600, which in one embodiment is a steam turbine, similar to the type used in a conventional steam power plant. The fluid 714 rejected from fluid to electric converter 600 is returned to the concentrator 700 where both the temperature and pressure of the fluid 714 are increased. The concentrator 700 is driven or actuated by the heat from hot thermal storage device 250. In an exemplary embodiment, the fluid 15 stored in the hot thermal storage device 250, the cold thermal storage device 450 and the fluid 716 used in concentrator 700 and in the electric converter 600 are all water in either liquid or steam form.

In one embodiment of the disclosed system 10, the heat concentration is done near the time of use, rather than at the time of collection. It will be understood by one of ordinary skill in the art that many different variations and configurations of elements shown in FIGS. 1A and 1B may be used while still using the heat actuated dual loop liquid piston heat pump and steam turbine method and apparatus disclosed herein.

In one example, it will be understood that the system 10 can operate at any time, such as, for example, during periods of high electricity demand rather than continuously during the 24 hour period, in which case fewer solar collectors and heat storage may be required for the same peak output level.

The pumping means 200 shown in FIG. 1B may include any type of pump, which is available commercially in various styles.

Figure 4:
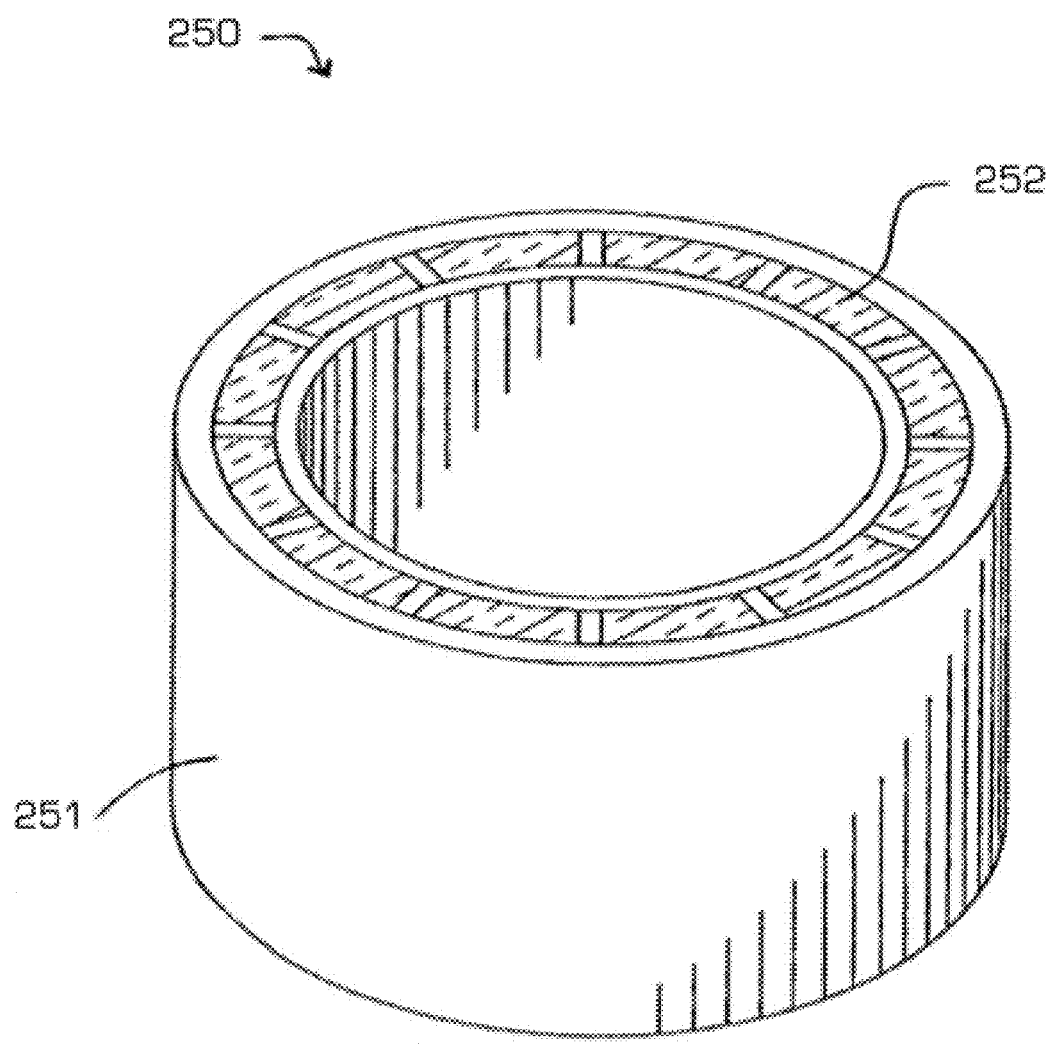
FIG. 4 is a cutaway perspective view of an exemplary hot thermal storage.

The thermal storage device 250 may be any type of reservoir, such as, for example, a reservoir capable of holding water at approximately 100 C and an atmospheric pressure of 0.1 MPa. The thermal storage device 250 may minimize the heat loss from the reservoir and substantially prevent entry of air into the reservoir. In this embodiment, the thermal storage device 250 is constructed from concrete 251 and an insulator 252 as shown in FIG. 4.

The cold thermal storage device 450 can be a similar type of tank as the hot thermal storage device 250. In this example, the cold thermal storage device 450 may store water in the liquid and vapor form at approximately 37 C. and 0.0062 MPa.

Figure 6:
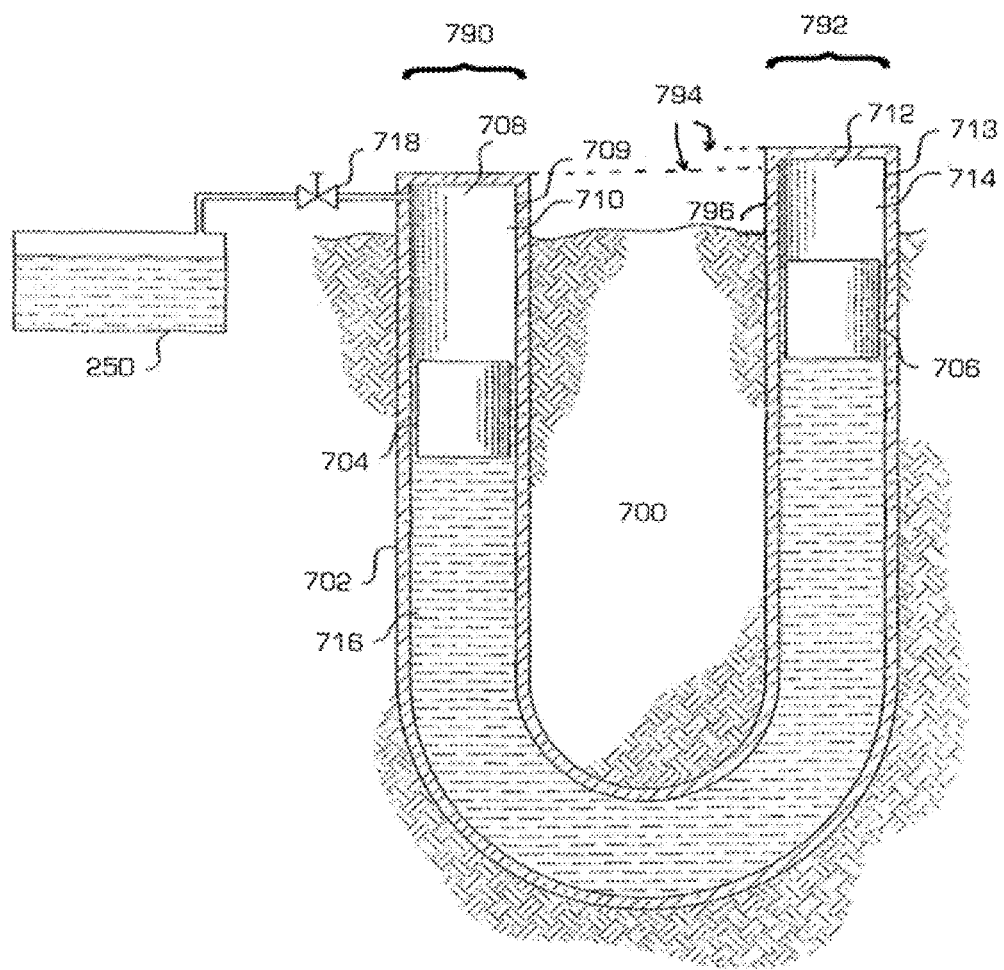
FIG. 6 shows example components of a heat actuated dual loop heat pump.

As shown in FIG. 6, the concentrator 700 in this example includes a heat actuated liquid piston heat pump 792. The concentrator 700 includes a concentrator wall 702, which forms an internal U shaped chamber. The concentrator wall 702 may be constructed with substantially the same diameter along the length of the tube. In this example, the concentrator wall 702 is constructed of concrete and is approximately 150 mm thick. The inside diameter of the U tube is approximately 10 m. The vertical legs are approximately 35 m long and the horizontal leg is approximately 10 m long. Additionally, in this example, the height of the vertical heat engine 790 vertical leg 709 is 0.3 m lower than the vertical heat pump leg 713.

The upper portions of the vertical legs 709, 713 may be made from a different material than the lower part of the U tube if desired. For example, the top 10 meters may be constructed of steel.

The lower portion of the concentrator 700 is filled with fluid, such as, water, and includes a liquid piston 716. A heat engine floating piston 704 floats on the top of the liquid piston 716 in one vertical leg, forming a heat engine expansion chamber 708 between the heat engine floating piston 704 and the concentrator wall 702. A heat pump floating piston 706 floats on top of the liquid piston 716 in the other vertical leg, forming a heat pump expansion chamber 712 between the heat pump floating piston 706 and concentrator wall 702. The heat engine expansion chamber 708 may be filled with heat engine fluid 710. The heat pump expansion chamber 712 may be filled with a heat pump fluid 714.

The construction of the heat engine floating piston 704 and the heat pump floating piston 706 may be constructed such as to minimize the thermal mass exposed to the heat engine expansion chamber wall 709.

Figure 7A:
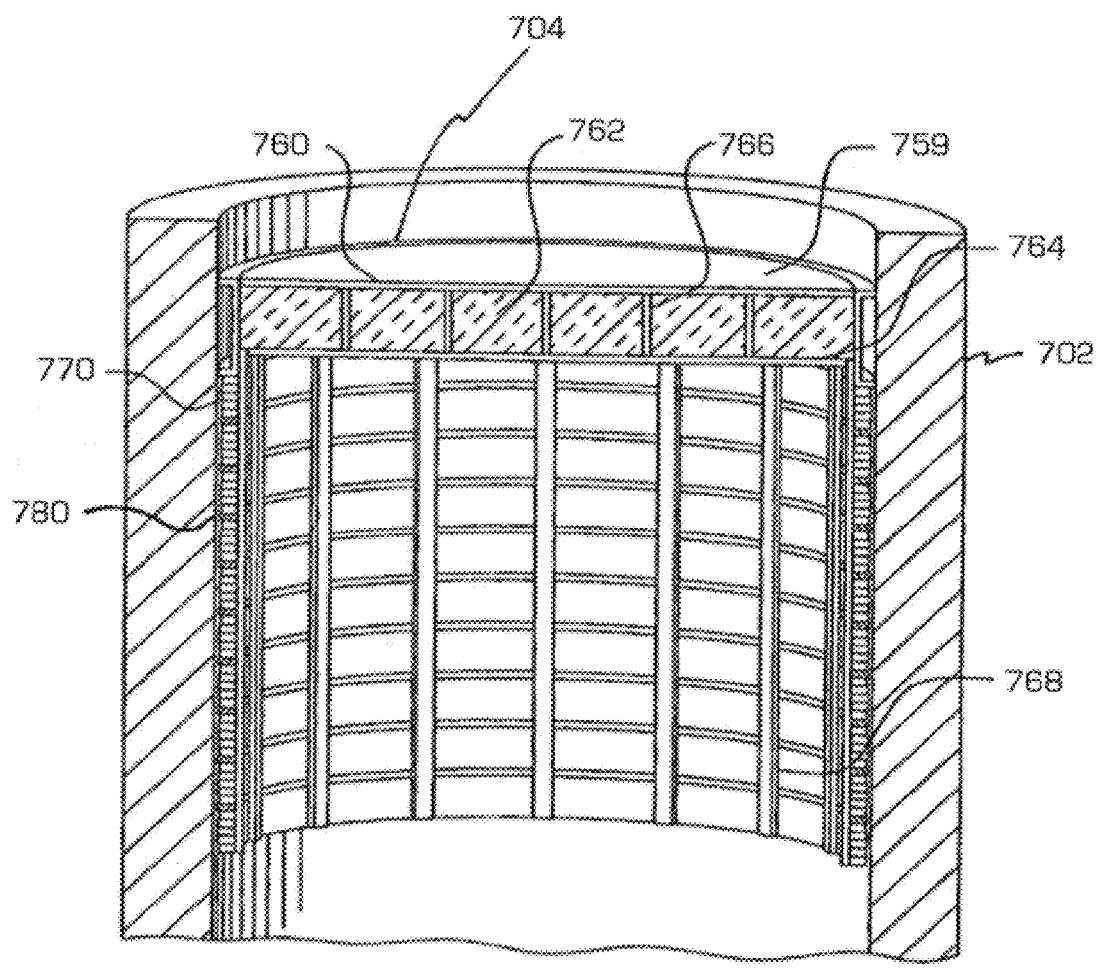
FIG. 7A shows a side view of a through section of an exemplary floating piston.

As shown in FIG. 7A, heat engine floating piston 704 has a piston top member 760, which includes the bottom wall of heat engine expansion chamber 708. Beneath the piston top member 760 is a layer of piston insulation 762. The piston insulation 762 may be a sufficient thickness and insulating value to reduce the heat losses through the piston top member 760. The density of the piston insulation 762 may also play a role in determining the depth at which heat engine floating piston 704 floats. Beneath the piston insulation 762 is a piston sealing member 764, which serves to seal the cavity formed by the piston sealing member 764 and the piston top member 760. A plurality of piston vertical supports 766 may run between the piston top member 760 and the piston sealing member 764, to support them against the pressure. In this embodiment, the piston top member 760, the piston sealing member 764, and the piston vertical supports 766 are made of aluminum. These members together form a piston top assembly 759.

The piston top assembly 759 is connected to a piston structure 768, which, in this example, is approximately 10 meters tall. A plurality of piston wall units 770 are fastened to a circumference of the piston structure 768, providing a thermal barrier between the heat engine expansion chamber wall 709 and the part of liquid piston 716 that is inside the heat engine floating piston 704.

Figure 7B:
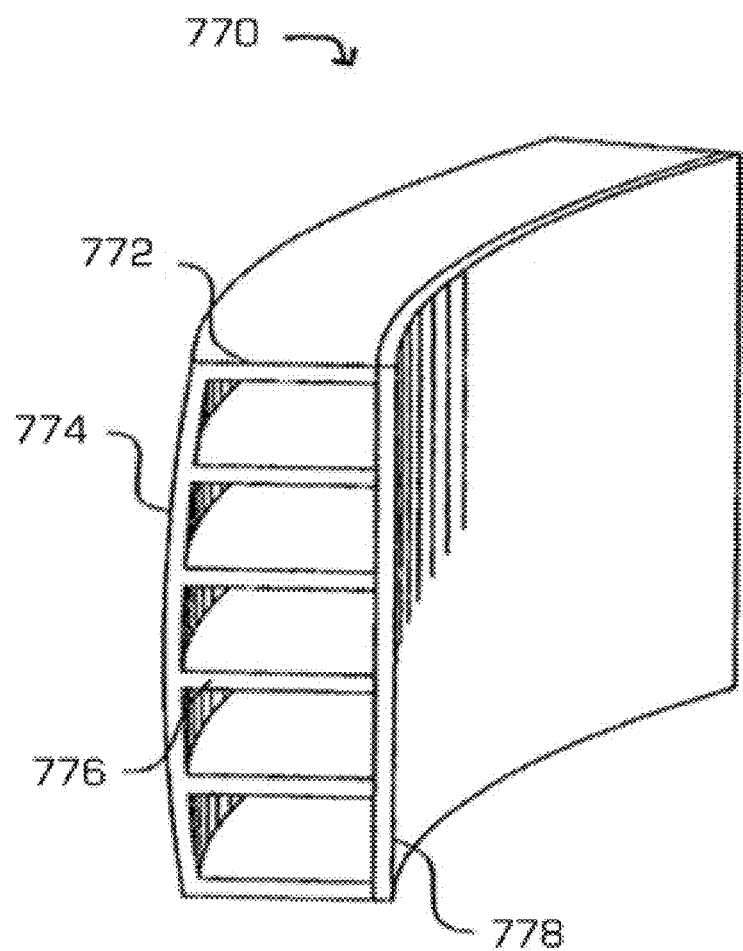
FIG. 7B shows a section detail of an exemplary piston wall unit.

An example of the piston wall unit 770 is shown in more detail in FIG. 7B.

The heat engine floating piston 704 may provide a small gap, such as, for example, approximately 2 mm, between the outer diameter of heat engine floating piston 704 and the inner diameter of concentrator wall 702. This gap may influence the efficiency of the system, as discussed below.

Figure 8:
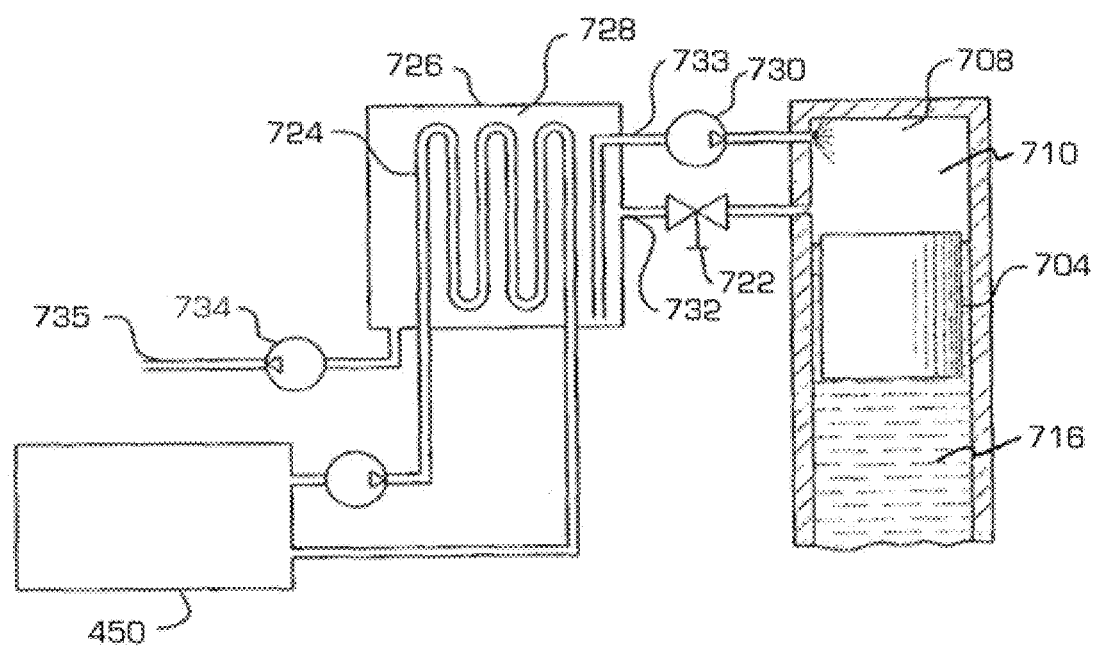
FIG. 8 shows a schematic view of an exemplary heat exchanger unit.

As shown in FIG. 8, an exhaust valve 722 and a piping system 732 connects the heat engine expansion chamber 708 to a heat exchanger chamber 726. The exhaust valve 722 may be controlled to turn on and off at the appropriate points in the cycle. As described below, a heat exchanger 724 is enclosed in the heat exchanger chamber 726. The heat exchanger 724 may be a standard heat exchanger as commonly known by persons of ordinary skill in the art. The heat exchanger 724 may be cooled using fluid 20 from the cold thermal storage device 450. A piping system 733 and a return pump 730 connects the heat exchanger chamber 726 and the heat engine expansion chamber 708 to pump water back into heat engine expansion chamber 708 in the form of a mist at the appropriate point in the cycle.

A piping system 735 and a pumping device 734 are connected to the bottom of heat exchanger chamber 726. The fluid 710 is pumped from the heat exchanger chamber 726, reheated in the heating device 100, and then returned to the hot thermal storage device 250.

Figure 9:
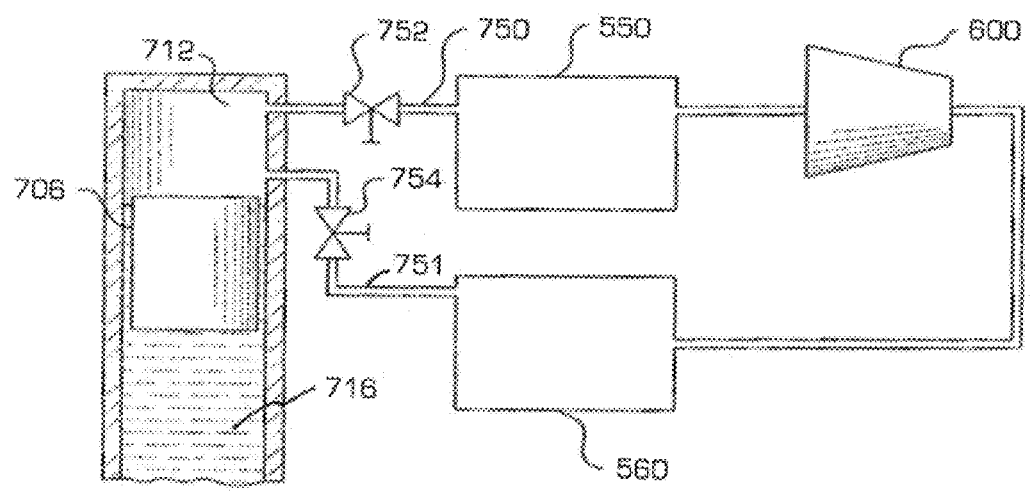
FIG. 9 shows a schematic view of a heat pump loop for converting energy.

FIG. 9 shows components used in a heat pump cycle of the heat pump 792. In this example, the heat pump expansion chamber 712 is connected to an ambient pressure chamber 550 with a piping system 750 that contains heat pump pressure valve 752. The ambient pressure chamber 550 is connected to the inlet of the fluid to electric converter 600, which in this case is a standard steam turbine. The outlet of fluid to electric converter 600 is connected to vacuum chamber 560. The vacuum chamber 560 is connected back to the heat pump expansion chamber 712 through a piping system 751 that contains a heat pump vacuum valve 754.

Figure 11:
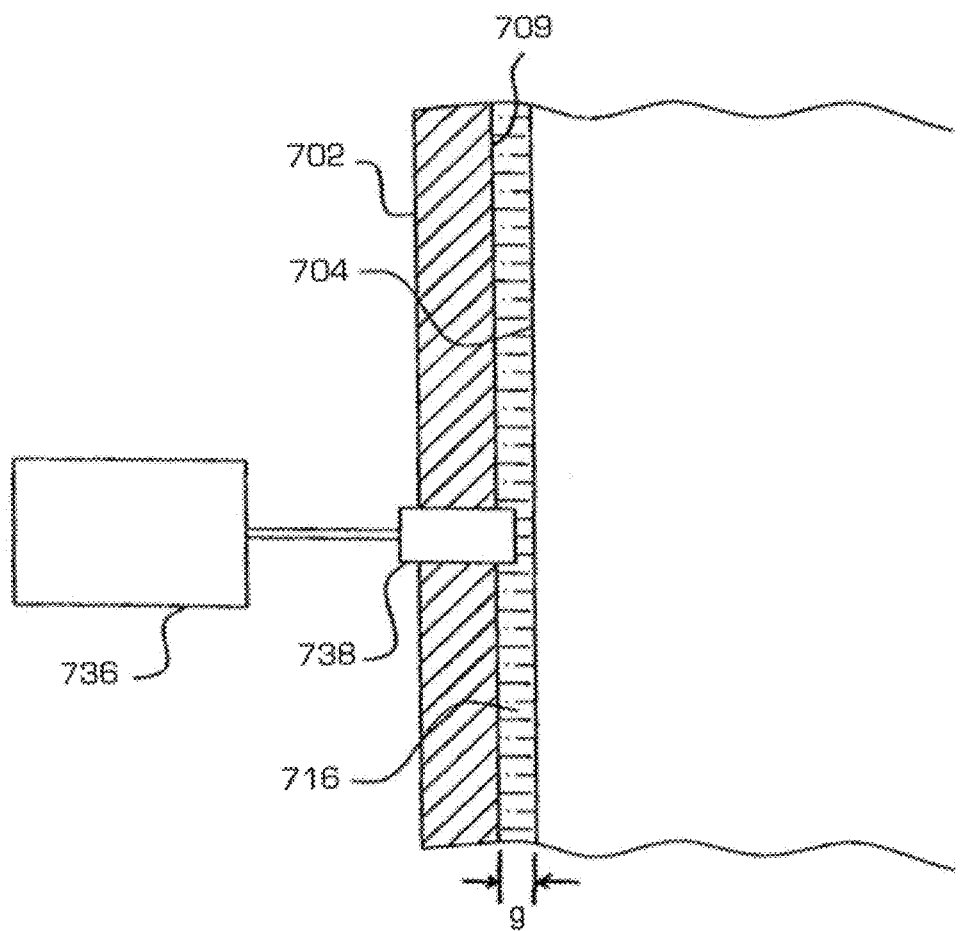
FIG. 11 shows an exemplary level control configuration.

FIG. 11 shows an actuator 736 and a partial sealing device 738, a plurality of which may extend, at least partially, around the circumference of liquid piston 716. In this example, the actuator 736 controls the gap (g) between the heat engine expansion chamber wall 709 and the heat engine floating piston 704 at one elevation. Activation of one or more sealing devices 738 closes the gap (g) for a particular circumferential span of the liquid piston 716, thereby impeding fluid flow between the liquid piston 716 and the expansion chamber 712. Activation and deactivation of the partial sealing devices 738 has the effect of a proportional flow control valve.

Persons of ordinary skill in the art will appreciate that the aforementioned example apparatus and processes below may be controlled by a processor, a controller, and/or similar computing device(s). Various processes may be executed by machine readable instructions and/or programs. The programs may be embodied in software stored on a tangible medium such as, for example, a flash memory, a CD-ROM, a floppy disk, a hard drive, a digital versatile disk (DVD), or a memory associated with the computer. Persons of ordinary skill in the art will readily appreciate that the entire program and/or parts thereof could alternatively be embodied in firmware or dedicated hardware in a well known manner (e.g., it may be implemented by an application specific integrated circuit (ASIC), a programmable logic device (PLD), a field programmable logic device (FPLD), programmable logic controller (PLC), personal computer (PC), discrete logic, etc.). Also, some or all of the machine readable instructions represented by flowcharts, discussed below, may be implemented manually. Further, persons of ordinary skill in the art will readily appreciate that many other methods of implementing the example machine readable instructions described below may alternatively be used. For example, the order of execution of various function blocks may be changed, and/or some of the blocks described may be changed, substituted, eliminated, or combined.

In operation, one embodiment of the system disclosed in this patent converts solar energy into electricity. Throughout this disclosure, energy and power levels and calculations generally refer to average levels over a 24-hour period. This differs from the typical practice of describing solar energy equipment in terms of peak power.

Figure 5:
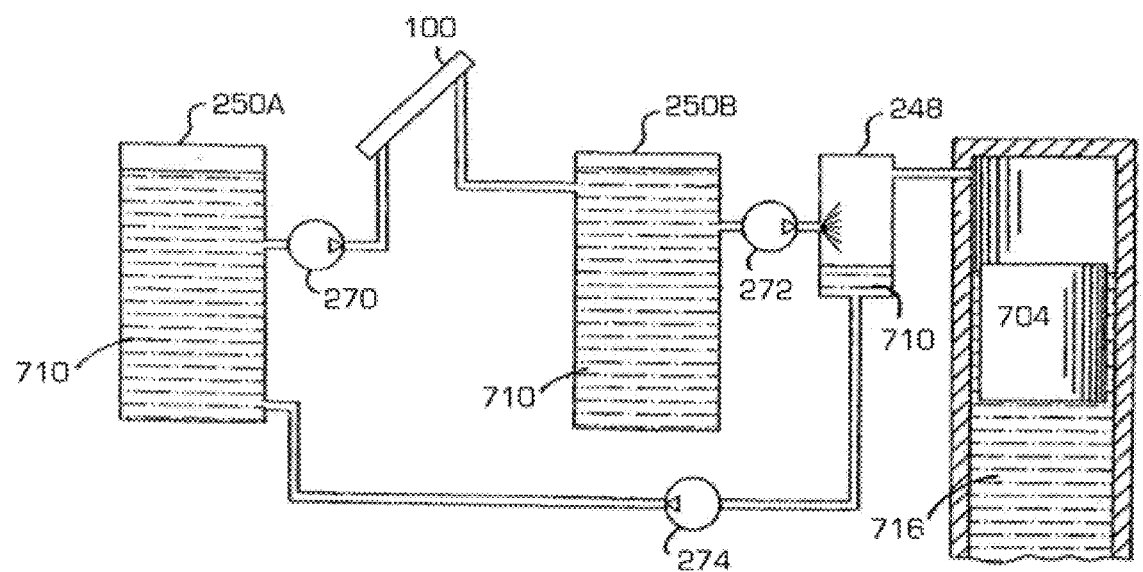
FIG. 5 illustrates an alternative embodiment of FIG. 3 using two thermal reservoirs.

It will be appreciated that any number of hot thermal storage devices 250 may be utilized, including, for example, a pair of hot thermal storage devices as shown in FIG. 5. In this type of system, fluid 710 may be pumped out of the first hot thermal storage device 250A by a first pump 270, through the heating device 100, and into the second hot thermal storage device 250B. Then, at the time of use, the fluid 710 is drawn from the second hot thermal storage device 250B by a second pump 272, evaporated in an evaporation chamber 248, which cools the remaining liquid 710, and then is pumped back to the first hot thermal storage device 250A by a third pump 274.

The cooling system may operate in an analogous manner and, alternatively, in this example, the system 10 utilizes the heating device 100 at night as the cooling device 300. This eliminates the need for the additional cost of a separate cooling device 300 and provides the additional advantage of preventing freezing of the cooling device 300 when ambient temperature is below 273 K.

Figure 16:
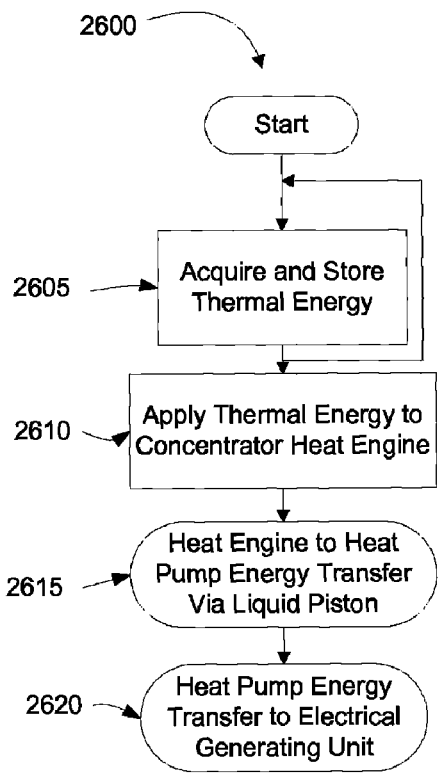
FIG. 16 illustrates a flow diagram of an example process to convert thermal energy to electricity.

A flowchart representative of an example process to implement the system of FIGS. 1A and 1B, is shown in FIG. 16. In this example, the process and/or machine readable instructions comprise a program for execution by a processor, controller, or similar computing device as described above. FIG. 16 is an example process 2600 for converting thermal energy to electricity. Generally speaking, the process 2600 acquires and stores thermal energy (block 2605) via one or more heat collectors 100, see FIG. 1.

Figure 13:
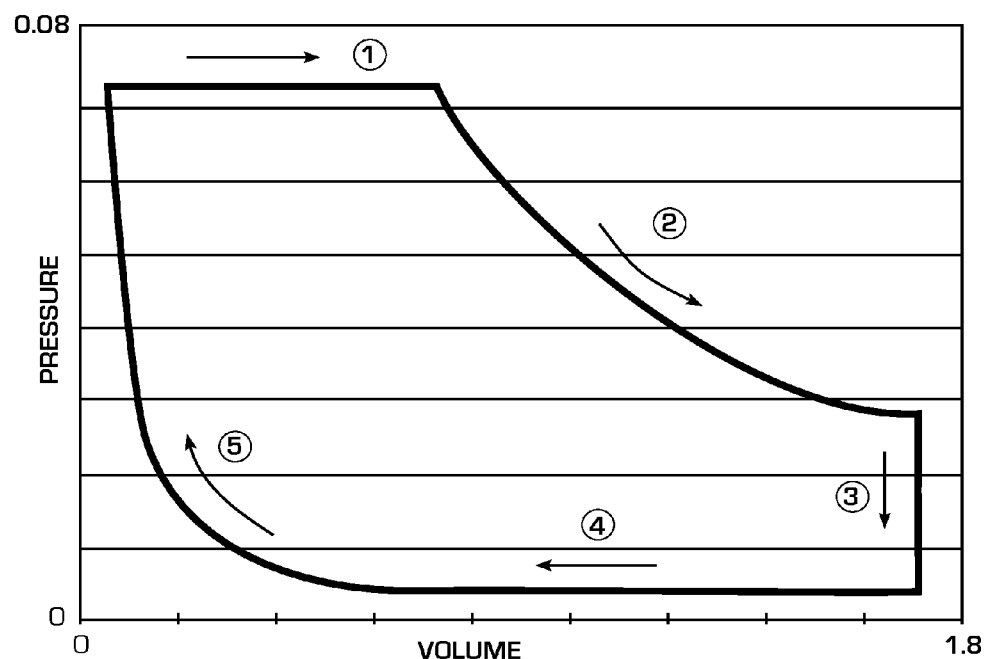
FIG. 13 shows a P-V diagram for an embodiment of a heat engine cycle.

An example thermodynamic cycle for the heat engine loop operates in the following manner, which is substantially different than a typical Carnot or Rankine cycle. Referring to FIGS. 6, 8 and 13, the liquid piston 716 and the heat engine floating piston 704 at top dead center, the inlet valve 718 is opened allowing the flow of fluid 710, e.g., steam, from the hot thermal storage device 250 into the heat engine expansion chamber 708. In the ideal cycle, this flow occurs in an isothermal, isobaric, and isentropic manner. In the actual cycle, the fluid 15 of the thermal storage device 250 may cool slightly. This section of the cycle is labeled as Process 1, Isothermal Expansion, in FIG. 13. At the beginning of Process 1, the heat engine fluid 710 comprises a saturated vapor. The heat engine supplies work to the liquid piston during this phase of the cycle.

Figure 17:
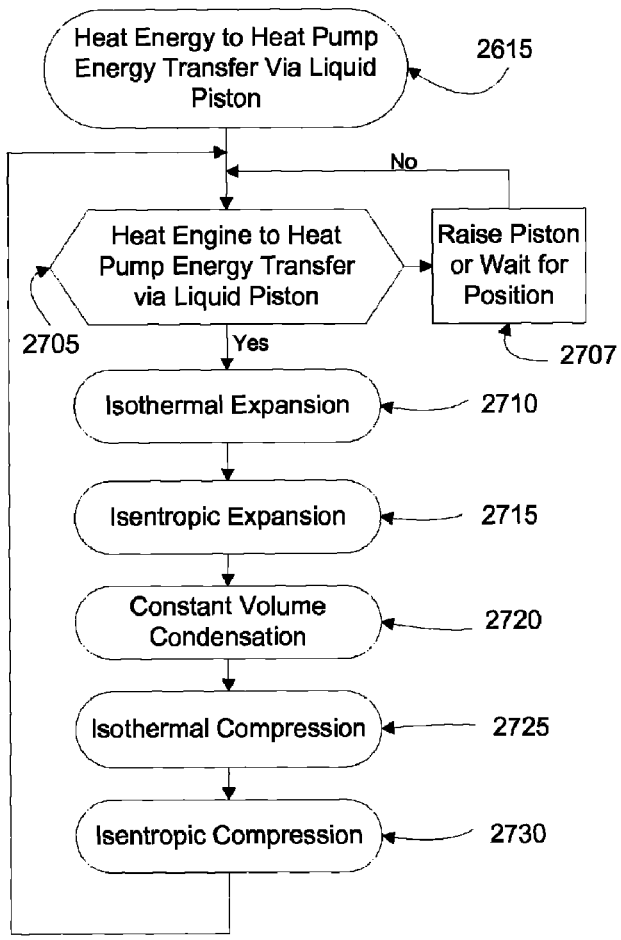
FIG. 17 illustrates a flow diagram of an example process for a heat engine cycle.
Figure 19:
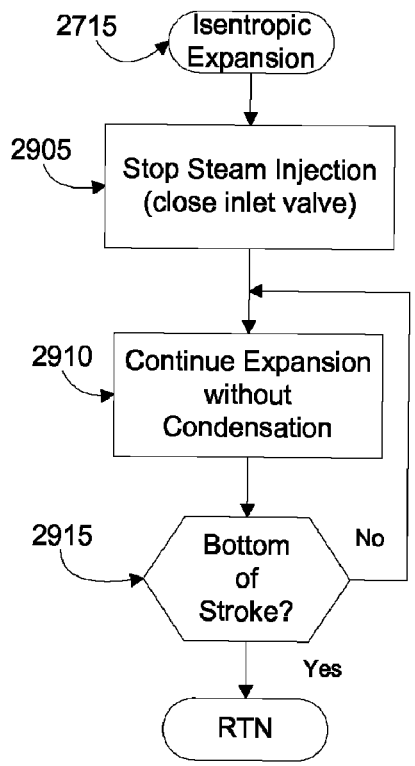
FIG. 19 illustrates a flow diagram of an example process for an isentropic expansion of the heat engine cycle of FIG. 17.

After the liquid piston 716 has moved down to expand the heat engine expansion chamber 708 (block 2810), inlet valve 718 is closed (block 2905), starting Process 2, Isentropic Expansion as shown in FIGS. 17 and 19. This volume change can be sensed using any suitable device, including, for example, a commercially available sensor, such as a laser distance measurement sensor. Alternatively, the beginning of Process 2 may be determined by measurement of process parameters such as temperature and pressure.

Controlling a temperature drop of both the steam and liquid phases at the same rate may be accomplished using several different methods. In this example, the concentrator wall 702 and the heat engine floating piston 704 are maintained at a temperature above the saturation point, as described in the analysis of thermal losses section, so that the liquid water will have no surface on which to condense and will basically form a fog or liquid suspended in vapor.

When the heat engine floating piston 704 reaches the bottom of the stroke, the heat engine exhaust valve 722 is opened see FIG. 8, connecting the heat engine expansion chamber 708 to the heat exchanger 724 located in the heat exchanger chamber 726. In an ideal cycle, the heat exchanger vapor 728 in the heat exchanger chamber 726 will be the same temperature and pressure as the heat engine fluid 710 in the heat engine expansion chamber 708.

As the heat engine floating piston 704 begins its upward stroke, Process 3, Isothermal Compression, starts. At the beginning of Process 3, the heat engine fluid 710 is a mixture of liquid and vapor at approximately 310.degree. K and 0.0062 MPa and the heat engine expansion chamber 708 is at a volume of approximately 1876 m.sup.3. The heat engine expansion chamber 708 begins to decrease in volume, compressing the heat engine fluid 710 and the heat exchanger vapor 728. As the steam begins to compress, the temperature and the pressure rise incrementally and the heat exchanger vapor 728 will begin to condense on the heat exchanger 724. Sufficient heat is transferred out of the system through the heat exchanger 724 so that this process proceeds isothermally. In the ideal cycle, a quantity of water is transferred from the heat exchanger chamber 726 so that the process also proceeds isentropically on a specific entropy basis. The total entropy decreases because heat and mass is transferred out of the system in this process. The liquid piston supplies work to the heat engine during Process 3.

After the proper amount of heat and mass have been transferred during Process 3, the exhaust valve 722 is closed, isolating the heat engine expansion chamber 708 from the heat exchanger chamber 726. In the ideal cycle, condensation and heat transfer in the heat exchanger chamber 726 would stop at this point, but in the actual cycle condensation and heat transfer can be allowed to proceed while the exhaust valve 722 is closed. Closing the exhaust valve 722 causes the start of Process 4, Isentropic Compression. At the beginning of Process 4, the heat engine fluid 710 includes of a mixture of liquid and vapor at a temperature of approximately 310.degree. K and a pressure of approximately 0.0062 MPa and the heat engine expansion chamber 708 has a volume of approximately 1443 m.sup.3. As the heat engine floating piston 704 continues upward, compression of the heat engine expansion chamber 708 is continued. The heat engine expansion chamber 708 contains a mixture of liquid and steam at this point in the cycle. During Process 4, the liquid evaporates and the heat engine fluid 710 becomes a saturated vapor. This is different from a typical compression process in which the mixture of liquid and vapor is compressed with the resultant fluid including saturated liquid. This difference is explained in subsequent paragraphs.

In the actual process, the liquid water of Process 4 may need to be added back into the heat engine expansion chamber 708 from the heat exchanger chamber 726 to reach the proper conditions at the beginning of Process 1. This can be done using the return pump 730 shown in FIG. 8. The amount of fluid 710 to be added back to the heat engine expansion chamber 708 can be determined by process conditions of the heat engine fluid 710 measured in the heat engine expansion chamber 708 or by other process parameters.

It is illustrative to compare the ideal heat engine cycle described in the prior sections to a typical ideal Carnot cycle. A Carnot cycle is a cycle that undergoes two isothermal reversible processes and two adiabatic reversible processes. By this definition, the ideal heat pump cycle disclosed herein is a form of a Carnot cycle because it has two isothermal reversible processes and two adiabatic reversible processes as can be easily seen in FIG. 16. However, the present heat engine cycle differs from the typical carnot cycle in several unique ways.

A typical Carnot cycle includes an isentropic compression process during which wet steam, which consists of steam and liquid, is compressed to saturated liquid. The heat engine cycle of this embodiment includes a isentropic compression process during which wet steam, which consists of steam and liquid, is compressed until the liquid evaporates to leave only saturated vapor.

The next process in both the Carnot cycle and the present heat engine cycle is a process of adding energy to the cycle. In the Carnot cycle the energy added, typically in the form of heat, isothermally evaporates the liquid until only saturated vapor remains. In the present cycle, only saturated vapor is present at the beginning of the energy addition process. In the present cycle, energy is added by isothermally adding mass, of saturated vapor, to the system.

A typical Carnot cycle also includes an isentropic expansion process that starts with saturated vapor and condenses to form a wet steam combination of vapor and liquid. The heat engine cycle of this embodiment also includes an isentropic expansion process during which saturated vapor is condensed to form a mixture of vapor and liquid.

The Carnot cycle's final process removes heat isothermally from the wet steam to obtain the same ratio of vapor and liquid as at the beginning of the cycle. The final process of the present invention isothermally removes heat and liquid to obtain the same ratio of vapor and liquid as at the beginning of the cycle.

The most distinct and unique difference between the two cycles occurs in the isentropic compression process where the typical Carnot cycle starts with wet steam and ends with saturated liquid, whereas the present cycle starts with wet steam and ends with saturated vapor. The disclosed process is relatively unintuitive because condensation from a vapor to a liquid is commonly associated with a compression process.

In the present cycle, the compression process must result in saturated vapor to maintain constant entropy as required by the isentropic nature of the process. In the present embodiment, only approximately 12.5% of the wet steam mixture is liquid at the beginning of the compression process. At the beginning of the process, the specific entropy of the liquid is approximately 0.53 kJ/kg-K and the specific entropy of the vapor is approximately 8.32 kJ/kg-K. At the end of the compression process, the specific entropy of the liquid is approximately 1.31 kJ/kg-K and the specific entropy of the vapor is approximately 7.36 kJ/kg-K. Quantitatively, an algebraic calculation equating total entropy at the beginning and end of the compression process with a single unknown of the amount of mass that changes between phases provides the all vapor result. Qualitatively, it can be seen that the relatively low percentage of liquid in the system at the beginning of the process drives the process to produce vapor. Because the majority of the system initially consists of high entropy vapor, converting all of the vapor to liquid at approximately 16% of the specific entropy cannot be a constant entropy process. However, if the process produces all vapor at approximately 88% of the initial vapor specific entropy, constant entropy can be maintained by converting the liquid to vapor, with the approximately 13.9 times increase in the liquid to vapor entropy balancing the approximately 12% drop in the specific entropy of the initial vapor mass.

In a typical Carnot cycle that has a high initial percentage of liquid, the process is reversed. In this case, using the same starting and ending entropy values, the specific entropy of the majority of the mass, which is liquid, increases by a factor of approximately 2.5, if the final result is liquid. The mass of vapor that condenses drops in entropy by a factor of approximately 6.4 to balance out the increase in entropy of the liquid. In the typical Carnot case, where the initial state is primarily liquid, the process can not end in vapor and maintain constant entropy because the majority of the mass would be increasing in entropy by a factor of approximately 13.9. The small drop in entropy of the initial vapor cannot offset such a large increase.

Another unique characteristic of the ideal cycle disclosed here is that the average specific entropy of the mass of both liquid and vapor during the heat engine cycle is constant throughout the cycle. The average specific entropy is always equal to the specific entropy of the vapor added to the cycle during the energy addition process. This is possible because low specific entropy liquid is removed from the system during the heat removal process. As heat is removed, high entropy vapor condenses to low entropy liquid, which has the effect of lowering the average specific entropy. However, at the same time, low entropy liquid mass is removed from the system, which raises the average specific entropy of the remaining mass, and offsets the previous effect.

It is not necessary to evaporate all of the liquid water at the end of Process 4. Some liquid water may remain in the heat engine expansion chamber 708 at this point without substantially changing the cycle.

Figure 12:
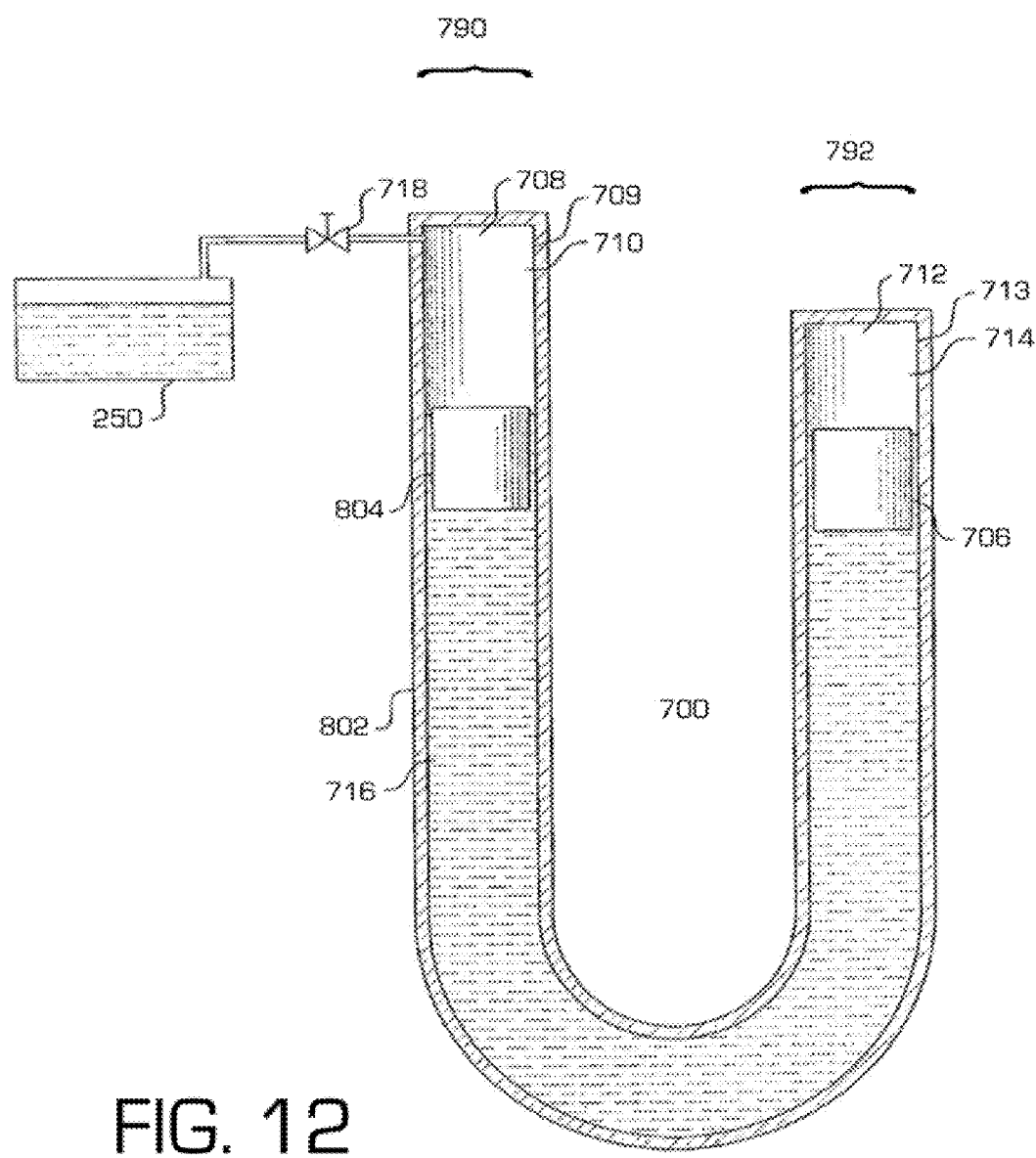
FIG. 12 shows example components of a heat actuated dual loop concentrator for an alternate embodiment.

An additional exemplary thermodynamic cycle for the heat engine loop of this embodiment operates in the following manner, which is substantially different than a typical Carnot or Rankine cycle, but is similar to a typical nineteenth century steam engine cycle. Refer to FIGS. 12-13, and the flowcharts of FIGS. 17-22. FIG. 17 illustrates additional detail of an example process of the heat engine to heat pump energy transfer (block 2615) described above in view of FIG. 16. The heat engine 790 position is checked by, for example, a laser distance measurement sensor to determine whether the heat engine piston 804 is at a top-stroke position (block 2705). If the heat engine piston 804 is not at the top-stroke position (block 2707), then the example process waits until the top-stroke position occurs. Persons of ordinary skill in the art will appreciate that, prior to steady-state harmonic operation of the concentrator pistons, the system may be initiated in a known state and/or pre-determined piston positions. For example, the fluid 710 (e.g., steam) may be injected into the concentrator 700 (e.g., the heat engine 790 side or the heat pump 792 side) to position the piston(s) 804, 706 into a known starting location and/or cycle the pistons 804, 706 through several strokes to get the system started. During steady-state harmonic operation of the heat engine 790, the heat engine chamber 708 may proceed through isothermal expansion (block 2710), isentropic expansion (block 2715), constant volume condensation (block 2720), isothermal expansion (block 2725), and isentropic expansion (block 2730). The process of FIG. 17 repeats in a harmonic manner when the heat engine piston 804 returns to the top-stroke position (block 2705).

Figure 18:
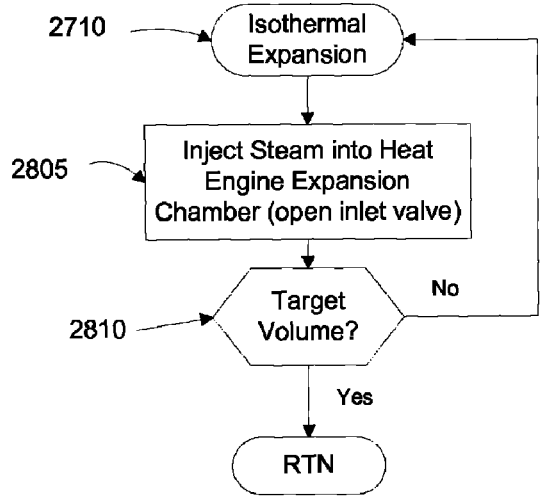
FIG. 18 illustrates a flow diagram of an example process for an isothermal expansion of the heat engine cycle of FIG. 17.

In view of FIG. 18 and starting with the liquid piston 716 and the heat engine floating piston 804 at top dead center, the inlet valve 718 is opened allowing the flow of steam from the hot thermal storage device 250 into the heat engine expansion chamber 708 (block 2805). In the ideal cycle, this flow occurs in an isothermal, isobaric, and isentropic manner. In the actual cycle, the fluid 15 of the hot thermal storage device 250 will cool slightly during each cycle, but this can be ignored for the purposes of understanding the cycle. This section of the cycle is labeled as Process 1, Isothermal Expansion in FIG. 13. At the beginning of Process 1, the heat engine fluid 710 may be a saturated vapor at approximately 364.degree. K and approximately 0.072 MPa and the heat engine expansion chamber 708 has a volume of approximately 0.046 m.sup.3. The heat engine 790 supplies work to the liquid piston 716 during this phase of the cycle.

After the liquid piston 716 has moved down to expand the heat engine expansion chamber 708 from approximately 0.046 m.sup.3 to approximately 0.717 m.sup.3 (block 2810), the inlet valve 718 is closed (block 2905), starting Process 2, Isentropic Expansion (block 2715), as shown in FIGS. 17 and 19. This volume change can be sensed using a commercially available sensor, for example, a laser distance measurement sensor. Alternatively, the point may be determined by measurement of process parameters such as the temperature and the pressure. Process 2 is expansion of the heat engine fluid 710 in the heat engine expansion chamber 708 along the saturation curve. At the beginning of Process 2, the heat engine fluid 710 is still saturated vapor at approximately 364.degree. K and approximately 0.072 MPa, but the volume of the heat engine expansion chamber 708 has expanded from approximately 0.046 m.sup.3 to approximately 0.717 m.sup.3. As the heat engine expansion chamber 708 expands, the pressure and the temperature of the heat engine fluid 710 drop and a part of the heat engine fluid 710 begins to change from the vapor and/or steam phase to liquid water. As the heat engine expansion chamber 708 continues to expand, the temperature and the pressure continue to drop and additional steam is changed to liquid water. In this example, the temperature of both the steam and the liquid phase drops at the same rate as the heat engine expansion chamber 708 expands. The heat engine supplies work to the liquid piston during this phase of the cycle.

Controlling the temperature of both the steam and the liquid phase to drop at the same rate may be accomplished using several different methods. In this example, the concentrator wall 802 and the heat engine floating piston 804 are maintained at a temperature above the saturation point, as described in the analysis of thermal losses section, so the liquid water will have no surface on which to condense and will basically form a fog or liquid suspended in vapor (block 2910). At the end of Process 2, the heat engine fluid 710 is at approximately 340.degree. K and approximately 0.027 MPa and the volume of the heat engine expansion chamber 708 is approximately 1.71 m.sup.3.

When the heat engine floating piston 804 reaches the bottom of the stroke (block 2915), Process 3 begins (shown in FIG. 19) as the heat engine exhaust valve 810 is opened (block 3005), connecting the heat engine expansion chamber 708 to the condensation chamber 812. In this example, the temperature and pressure in the condensation chamber 812 is lower than temperature and pressure in the heat engine expansion chamber 708 when the heat engine exhaust valve 810 opens. Additional condensation in the condensation chamber 812 occurs, causing the temperature and the pressure in the heat engine expansion chamber 708 to rapidly drop. This is shown as Process 3, condensation at constant volume. In practice, the volume changes slightly during Process 3, but the change in volume is minimal compared to the other processes. At the end of Process 3, the heat engine fluid 710 is saturated vapor at approximately 301.degree. K and approximately 0.0038 MPa and the volume of the heat engine expansion chamber 708 is approximately 1.71 m.sup.3.

Figure 20:
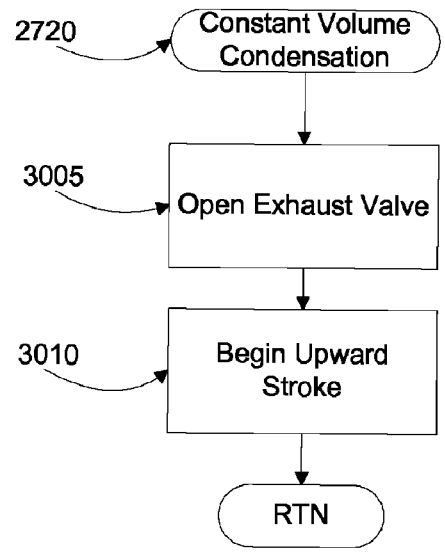
FIG. 20 illustrates a flow diagram of an example process for a constant volume condensation of the heat engine cycle of FIG. 17.
Figure 21:
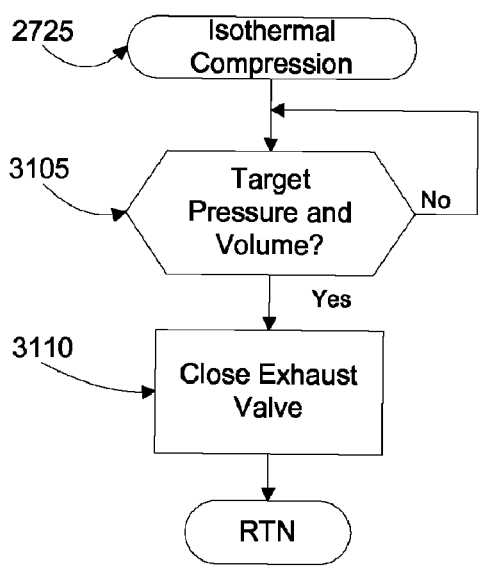
FIG. 21 illustrates a flow diagram of an example process for an isothermal compression of the heat engine cycle of FIG. 17.

As the heat engine floating piston 804 begins its upward stroke (block 3010) as shown in FIG. 20 due to inertial forces of the system 10, Process 4, Isothermal Compression, starts as shown in FIG. 21. At the beginning of Process 4, the heat engine fluid 710 is a mixture of liquid and vapor at approximately 301.degree. K and approximately 0.0038 MPa and the heat engine expansion chamber 708 is at a volume of approximately 1.71 m.sup.3. The heat engine expansion chamber 708 begins to decrease in volume, compressing the heat engine fluid 710. As the steam begins to compress, the temperature and the pressure rise incrementally and the steam will begin to condense in the condensation chamber 812. Sufficient heat is transferred out of the system 10 through the condensation process so that this process proceeds isothermally. The liquid piston supplies work to the heat engine during Process 4, Isothermal Compression. At the end of Process 4, the heat engine fluid 710 is at approximately 301.degree. K and approximately 0.0038 MPa and the volume of the heat engine expansion chamber 708 is approximately 0.646 m.sup.3 (block 3105).

Figure 22:
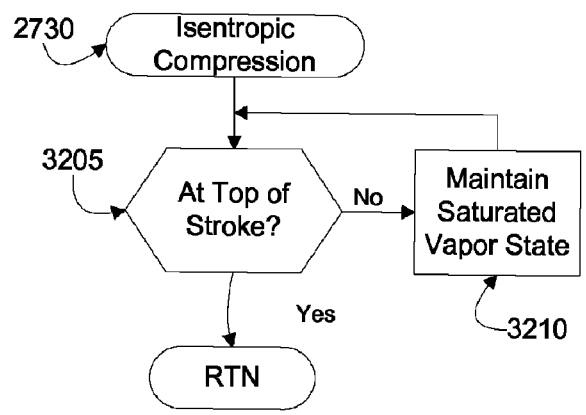
FIG. 22 illustrates a flow diagram of an example process for an isentropic compression of the heat engine cycle of FIG. 17.

After the proper amount of heat and mass have been transferred during Process 4, the exhaust valve 810 is closed (block 3110), isolating the heat engine expansion chamber 708 from the condensation chamber 812. Closing the exhaust valve 810 causes the start of Process 5, Isentropic Compression, as shown in FIG. 22. At the beginning of process 5, the heat engine fluid 710 includes a mixture of liquid and vapor at a temperature of approximately 301.degree. K and a pressure of approximately 0.0038 MPa and the heat engine expansion chamber 708 has a volume of approximately 0.646 m.sup.3. As the heat engine floating piston 804 continues upward, compression of the heat engine expansion chamber 708 is continued. The heat engine expansion chamber 708 contains a mixture of liquid and steam at this point in the cycle. During Process 5, the liquid evaporates and the heat engine fluid 710 becomes a saturated vapor at a temperature of approximately 364.degree. K and a pressure of approximately 0.072 MPa (blocks 3210 and 3205). When the heat engine floating piston 804 reaches the top of its stroke, the process repeats in an iterative manner, as shown in FIG. 17.

It can be noted that all four heat engine processes occur on the saturation line. The processes that are isentropic are only isentropic when both the liquid and vapor phases are considered. The entropy of each individual phase is not constant.

Heat Pump Cycle

A Carnot cycle is a cycle that undergoes two isothermal reversible processes and two adiabatic reversible processes, the internal heat pump cycle of heat pump fluid 714 inside of the heat pump expansion chamber 712 consists of a Carnot cycle.

Figure 23:
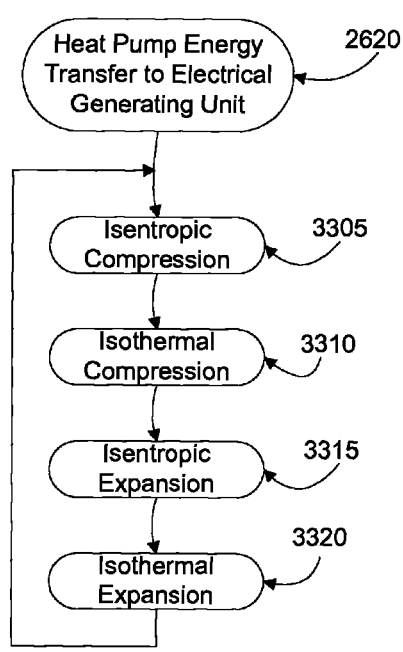
FIG. 23 illustrates a flow diagram of an example process for a heat pump cycle.

This description of operation is illustrated in FIG. 23 and starts at the point where the heat pump floating piston 706 of FIG. 12 is at the bottom stroke, which occurs at the same instant in time that heat engine floating piston 804 is at the top stroke. The heat pump fluid 714 is a superheated vapor throughout all four processes of the heat pump cycle. The heat pump cycle processes may include, but are not limited to, an Isentropic compression process (block 3305), an Isothermal compression process (block 3310), an Isentropic expansion process (block 3315), and an Isothermal expansion process (block 3320).

Figure 15:
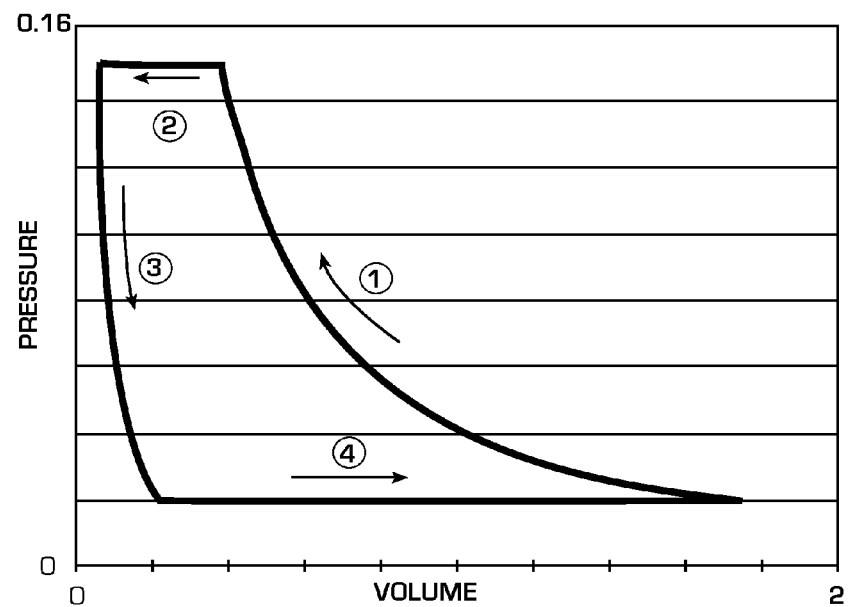
FIG. 15 shows a P-V diagram for an embodiment of a heat pump cycle.
Figure 24:
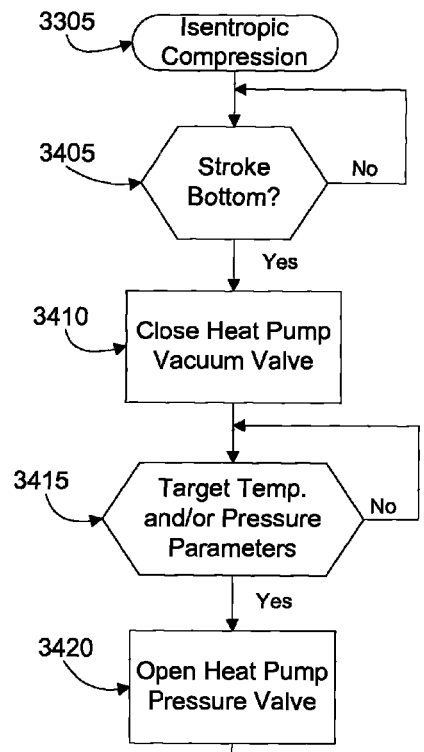
FIG. 24 illustrates a flow diagram of an example process for an isentropic compression of the heat pump cycle of FIG. 23.
Figure 25:
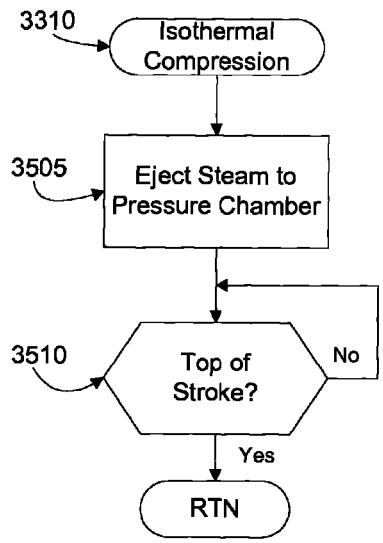
FIG. 25 illustrates a flow diagram of an example process for an isothermal compression of the heat pump cycle of FIG. 23.

Process 1, as shown in FIG. 24, is isentropic compression as the heat pump floating piston 706 starts at the bottom of the stoke (block 3405) with the heat pump vacuum valve closed (block 3410), and begins upward travel. The heat pump fluid 714 starts Process 1 as shown in FIG. 15 at approximately 376.degree. K and approximately 0.0193 MPa and the heat pump expansion chamber 712 has a volume of approximately 1.71 m.sup.3. As the heat pump floating piston 706 travels upward, the heat pump fluid 714 is compressed isentropically to a temperature of approximately 612.degree. K and approximately 0.15 MPa, which is slightly above atmospheric pressure.

When the heat pump expansion chamber 712 reaches a volume of approximately 0.38 m.sup.3 (block 3415), the heat pump pressure valve 752 is opened (block 3420) connecting the heat pump expansion chamber 712 to the pressure chamber 550 as shown in FIG. 9. This is the start of Process 2, as shown in FIG. 15, which is an isothermal process of ejecting steam from the heat pump expansion chamber 712 to the pressure chamber 550 (block 3505) as shown in FIG. 9. Because the pressure chamber 550 is substantially larger than the heat pump expansion chamber 712, the process is idealized by assuming that the temperature and pressure in the pressure chamber 550 remain substantially unchanged during Process 2. In practice, multiple individual units, typically 18, of the concentrator 700 would be running out of phase to each other, so that a somewhat continuous flow of steam would be provided to the pressure chamber 550. In addition, a continuous flow of steam would be withdrawn from the pressure chamber 550 to the fluid to electric converter 600, which in this embodiment is a 650 kW steam turbine/generator set. As Process 2 begins, the heat pump expansion chamber 712 and the pressure chamber 550 are both at approximately 612.degree. K and approximately 0.15 MPa. The heat engine floating piston 804 continues upward until the volume of the heat pump expansion chamber 712 is approximately 0.046 m.sup.3, at which point the heat engine floating piston 804 is at the top of stroke (block 3510). The temperature of the heat pump expansion chamber 712 remains at approximately 612.degree. K and approximately 0.15 MPa.

Figure 26:
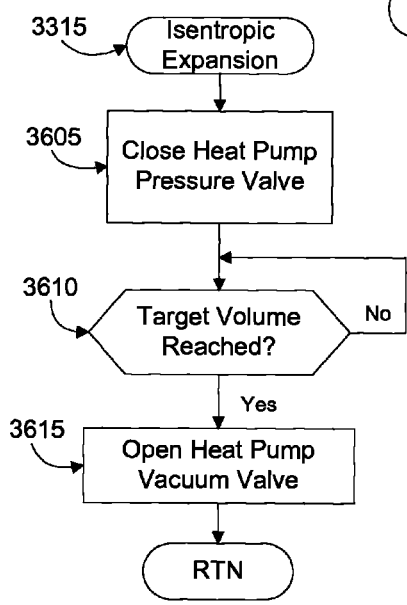
FIG. 26 illustrates a flow diagram of an example process for an isentropic expansion of the heat pump cycle of FIG. 23.
Figure 27:
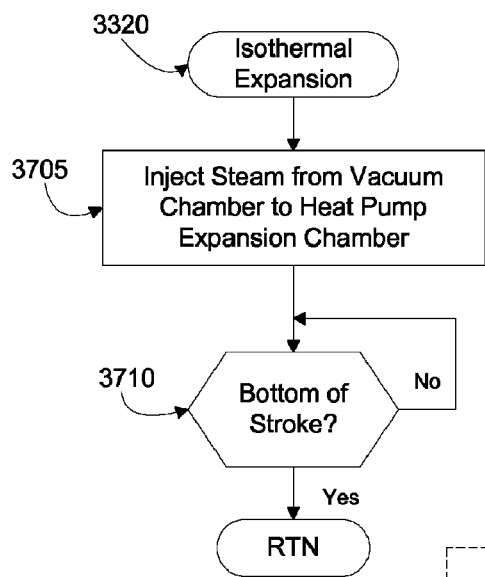
FIG. 27 illustrates a flow diagram of an example process for an isothermal expansion of the heat pump cycle of FIG. 23.

At the top of stroke, the heat pump ambient pressure valve 752 is closed (block 3605) and Process 3 begins, as shown in FIGS. 15 and 26. Process 3 is isentropic expansion. Process 3 continues (block 3610) until the heat pump expansion chamber 712 reaches a volume of approximately 0.22 m.sup.3, at which point the heat pump vacuum valve 754 is opened (block 3615).

This starts Process 4, as shown in FIG. 37, which is an isothermal injection of steam from the vacuum chamber 560 to the heat pump expansion chamber 712 (block 3705). Process 4 is idealized for this discussion for reasons identical to those described for Process 2. The heat pump expansion chamber 712 starts and ends Process 4 at a temperature of approximately 376.degree. K and approximately 0.0193 MPa. When the heat engine floating piston 804 reaches the bottom stroke (block 3710), the heat pump vacuum valve 754 is closed and Process 1 begins again.

The heat pump fluid 714 flows from the heat pump expansion chamber 712 to the pressure chamber 550 to the fluid to electric converter 600 where it undergoes an isentropic expansion process in the fluid to electric converter 600. It enters fluid to the electric converter 600 at a temperature of approximately 612.degree. K and approximately 0.15 MPa and exits at a temperature of approximately 376.degree. K and approximately 0.0193 MPa, which are the same conditions as those of the pressure chamber 550 and the vacuum chamber 560.

It will be easily understood that all of the thermodynamics conditions described above are simply one set of many that may be selected without changing the nature of the thermodynamic cycles.

Operation of Liquid Piston

The mass of the liquid piston 716 and the floating pistons may play a key role in the operation of the system 10. For example, the total mass affects the resonant frequency of the system and, therefore, may have a major influence on the cycle time of the system 10. Streeter's Fluid Mechanics shows the physical response of a liquid filled U tube in section 12.1, "Oscillation of Liquid in a U tube." The physics of the present system 10 are closely related to that described by Streeter, but differ because the present example system 10 uses a closed U tube and applies a driving force. The system 10 is essentially in resonance between the kinetic energy of the mass of the liquid piston 716, the heat engine floating piston 704 and the heat pump floating piston 706, the gravitational potential energy of the vertical legs of liquid piston 716, the heat engine floating piston 704 and the heat pump floating piston 706 and the potential energy stored in the heat engine fluid 710 and the heat pump fluid 714. The inlet valve 718 is opened and closed at the proper times to apply and remove the force of the heat engine in phase with the natural frequency of the system 10.

A throttling valve may not be required on the inlet valve 718, which removes any associated losses, because of the nature of the system 10. An energy balance is achieved between energy put into the system 10 in the form of work provided by the heat engine loop and the energy taken out in the form of work done in the heat pump loop as well as losses.

The theoretical efficiency of the heat actuated dual loop heat pump with the thermodynamic conditions of this exemplary embodiment is approximately 15.3% versus a Carnot efficiency of approximately 16.9%. The additional losses are believed to be related to the manner in which the mass that enters and exits the cycle compared to a Carnot cycle, which uses heat flow into and out of the system.

This efficiency calculation is only for the heat actuated dual loop heat pump and does not include heat losses in the heat pump, solar collection losses, or losses in the steam turbine 600. The steam turbine 600 may run at an efficiency of approximately 83%. The high efficiency of the steam turbine 600 is common because the closed heat pump to steam turbine cycle does not involve any rejection of heat.

Analysis of Thermal Losses During Heat Engine and Heat Pump Cycle

Condensation of the heat engine fluid 710 onto the heat engine expansion chamber wall 709 of the heat engine expansion chamber 708 may cause a decrease in the efficiency of the heat engine 790. Condensation of the heat pump fluid 714 onto the heat pump expansion chamber wall 713 of the heat pump expansion chamber 712 may cause a decrease in the efficiency of the heat pump 792. Boiling of the liquid piston 716 from the heat pump expansion chamber wall 713 of the heat pump expansion chamber 712 into the heat pump fluid 714 may reduce the quality of the heat pump fluid 714. Boiling of the liquid piston 716 into the heat engine expansion chamber 708 during the compression stage typically has a lower impact, because the heat engine fluid 710 is saturated, and boiling occurs during this process as a normal part of the cycle.

There may also be heat transfer losses through the heat engine expansion chamber wall 709 and the heat pump expansion chamber wall 713. However, as long as condensation or boiling doesn't occur, these losses are typically not significant. Boiling typically does not occur above the top of the liquid piston at the upper end of stroke, because there is no liquid present to boil. Condensation above this point can be prevented by maintaining the temperature of the heat engine expansion chamber wall 709 and the heat pump expansion chamber wall 713 at or above the saturation temperature for the highest pressure point in the cycle. This is also applicable to the top face of the heat engine floating piston 704 and the heat pump floating piston 706. By using an adequate amount of insulation behind the wall and below the top of the piston, heat transfer losses may be lowered. In an exemplary embodiment, described herein, the wall would be maintained at a temperature of at least approximately 373.degree. K.

Losses where the liquid piston intermittently contacts the heat engine expansion chamber wall 709 and the heat pump expansion chamber wall 713 during the oscillating stroke are additional potential losses in the heat actuated dual loop liquid piston heat pump system. There are several methods to reduce the losses, including pumping liquid into and out of the system 10 and various methods involving insulation and low thermal mass. One method is described in more detail in the following paragraphs.

Figure 10:
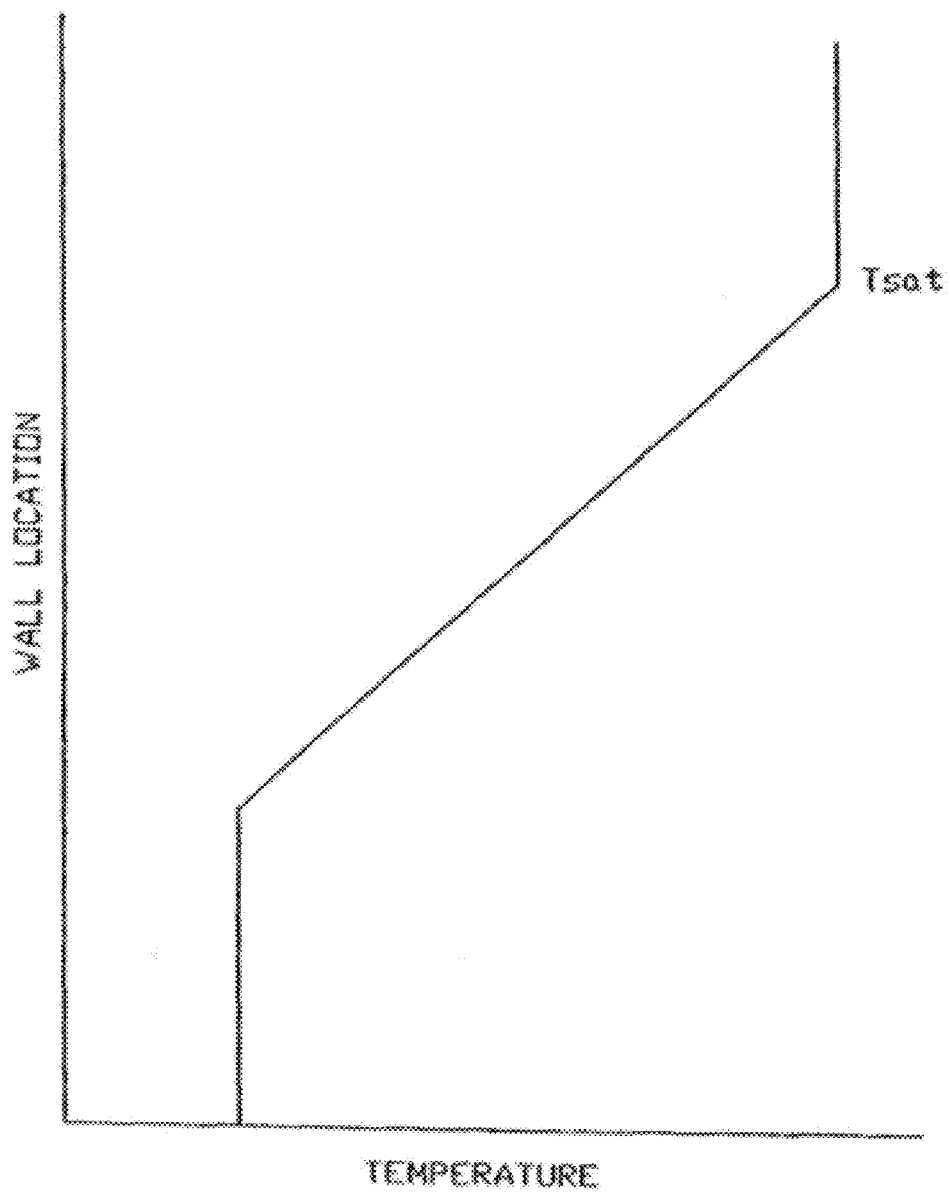
FIG. 10 shows an exemplary thermal wall profile.

The losses in the system 10 may be lowered by eliminating or reducing condensation and boiling from the heat engine expansion chamber wall 709 and the heat pump expansion chamber wall 713 during the cycle. The discussion will initially refer to the heat engine expansion chamber wall 709, with differences that apply only to the heat pump expansion chamber wall 713 being discussed later. At any point in the cycle, vapor in the heat engine expansion chamber 708 may not condense onto a surface if the temperature of the surface is above the saturation temperature. At any point in the cycle, the liquid in the liquid piston 716 will not boil if the temperature of the liquid and the adjacent section of heat engine expansion chamber wall 709 are below the saturation temperature. Therefore, this method may reduce losses by maintaining the heat engine expansion chamber wall 709 of the heat engine expansion chamber 708 at an approximate temperature gradient as shown in FIG. 10. The wall temperature at the level of the top of liquid piston 716 and the bottom of the heat engine expansion chamber 708 may be maintained at the saturation temperature of the heat engine fluid 710 at the same point in the cycle. This temperature gradient can be maintained by an external heating device along the length of the wall or by designing the wall in a manner which naturally maintains the gradient. A complication may arise because this temperature is not the same for the compression and expansion strokes, as is discussed several paragraphs below.

The thermal mass of the wall of the heat engine expansion chamber 708 will normally be much higher than the thermal mass of the combination of that part of the liquid piston 716 which is located between the heat engine expansion chamber 708 and the heat engine floating piston 704 and the outer wall of heat engine floating piston 704. It may be advantageous to reduce the mass of the liquid piston 716 and the heat engine floating piston 704 in the described area. This can be accomplished in any suitable manner, including, for example, by manufacturing the heat engine expansion chamber 708 and the heat engine floating piston 704 to dimensions and tolerances which provide a small gap between the heat engine expansion chamber 708 and the heat engine floating piston 704 and provide a thin wall on the heat engine floating piston 704. A gap of around 2 mm is used for this example. The wall of the heat engine floating piston 704 can be manufactured as shown in FIG. 7B with a wall thickness of around approximately 2 mm.

When the liquid piston 716 is at the top stroke, the liquid at the top of the liquid piston 716 between the heat engine floating piston 704 and the heat engine expansion chamber wall 709 may be at a slightly lower temperature than the adjacent section of the heat engine expansion chamber wall 709. Heat will flow from the heat engine expansion chamber wall 709 into the adjacent element of the liquid piston 716. As the liquid piston 716 begins to drop, this same element will now be adjacent to a lower and colder section of the heat engine expansion chamber wall 709. Heat will flow from the element of liquid piston 716 into the adjacent element of the heat engine expansion chamber wall 709. Due to the differences in thermal mass, this typically will cool the element of the liquid piston 716 and slightly raise the temperature of the element of the heat engine expansion chamber wall 709. This process may continue as the liquid piston 716 continues to drop, until the same element of the liquid piston 716 is completely cooled by the time that it reaches the bottom of the stroke.

The process is reversed on the upward stroke of the liquid piston 716. As the element of the liquid piston 716 begins to rise, it will be adjacent to a warmer element of the heat engine expansion chamber wall 709. Heat will typically flow from the adjacent element of the heat engine expansion chamber wall 709 into the element of the liquid piston 716, raising the temperature of the liquid piston 716. This will continue as the liquid piston 716 rises, with the result that the element of the liquid piston 716 will be nearly at the maximum temperature of the heat engine expansion chamber wall 709 when it reaches the top stroke.

This process may substantially increase the efficiency of the system. If heat was added to the element of the liquid piston 716 at the top of stroke and rejected at the bottom of stroke, approximately an additional 5% heat would need to be added to the system during each stroke, even with a gap between the heat engine floating piston 704 and the heat engine expansion chamber wall 709 that was one tenth the of the size described herein.

With the process described herein, only a very small amount of heat is added to the system during each stroke because almost all of the heat required to heat the portion of liquid piston 716 in the gap between the heat engine floating piston 704 and the heat engine expansion chamber wall 709 is recycled between the element of liquid piston 716 and the heat engine expansion chamber wall 709 during the cycle.

A similar process occurs for the outer wall of the heat engine floating piston 704, with the outer wall transferring heat back and forth through the liquid piston 716 to the heat engine expansion chamber wall 709 during each cycle.

In order to accomplish work with the heat engine, the saturation temperature and pressure is typically lower for a given volume during the compression stroke when compared to the expansion stroke. If the height of the top of the liquid piston 716 in the gap between the heat engine floating piston 704 and the heat engine expansion chamber wall 709 relative to the top surface of the heat engine expansion chamber wall 709 is constant throughout the entire cycle, boiling will occur in the compression stroke or condensation will occur in the expansion stroke on the heat engine expansion chamber wall 709. This has the effect of lowering the efficiency of the system.

As a result, the system 10 may be, alternatively, operated at a higher efficiency if the height of the top of liquid piston 716 is varied relative to the height of the heat engine floating piston 704 during the cycle. One method of accomplishing this is shown in FIG. 11. During the compression stroke, the partial sealing device 738 is moved towards the heat engine floating piston 704 by the actuator 736. This slows down the flow of water into the gap between the heat engine floating piston 704 and the heat engine expansion chamber wall 709, lowering the top surface of the liquid piston 716. As the heat engine floating piston 704 nears the top of stroke, the partial sealing device 738 is moved away from the heat engine floating piston 704 by the actuator 736, allowing liquid to rise in the gap between the heat engine floating piston 704 and the heat engine expansion chamber wall 709, relative to the top surface of the heat engine floating piston 704.

The height of the liquid between the heat engine floating piston 704 and the heat engine expansion chamber wall 709 can be sensed using a variety of sensors, for example, a pressure transducer. The height of the liquid can then be controlled by providing the necessary gap (g) between the partial sealing device 738 and the heat engine floating piston 704 at each point in the cycle. This allows the top of the liquid to be at the correct point on the heat engine expansion chamber wall 709 to maintain the temperature of the top of the liquid at the saturation temperature for both the expansion and the compression stroke.

The situation is similar, but reversed, on the heat pump side of the system. Again, a thermal gradient is maintained on the heat pump expansion chamber wall 713, corresponding to the saturation temperature for a corresponding volume of the heat pump expansion chamber 712. In this case, the top of liquid piston 716 relative to the top of heat pump floating piston 706 is maintained at a higher level during the compression stroke and a lower level during the expansion stroke.

In addition, the heat pump 792 uses superheated steam rather than saturated steam, so the temperature of the heat pump fluid 714 is above the saturation temperature. However, as long as unwanted condensation and evaporation are avoided, the heat transfer coefficients are low enough that the heat losses are minimal.

It will be appreciated by persons of ordinary skill in the art that there are various methods to minimize heat losses of the apparatus disclosed herein, while still utilizing the concept of a heat actuated dual loop liquid piston heat pump.

It should be noted that the desired temperature gradient on the heat pump expansion chamber wall 713 may be different than that on the heat engine expansion chamber wall 709.

An alternate embodiment of the concentrator 700 utilizing different operating parameters for the heat engine and heat pump loops is described below. In this example, the heat pump loop operates above atmospheric pressure during part of the cycle.

The concentrator 700 in this embodiment includes a heat actuated liquid piston heat pump. As shown in FIG. 22, it is constructed in the general form of a U, square, or other suitable shape. The U tube includes a concentrator wall 802, which forms an internal U shaped chamber. The concentrator wall 802 is constructed with substantially the same diameter along the length of the tube. In this example, the concentrator wall 802 is constructed of aluminum and is approximately 3 mm thick. The inside diameter of the U tube is approximately 1.5 m. The vertical legs are approximately 3 m long and the horizontal leg is approximately 1 m long. The height of the vertical heat engine leg is 1.5 m higher than the vertical heat pump leg.

The lower portion of the internal cavity is filled with water in the liquid form, which includes the liquid piston 716. In this embodiment, the liquid piston 716 has a volume of approximately 9 cubic meters and a mass of approximately 9,000 kg. The heat engine floating piston 804 floats on the top of the liquid piston 716 in one vertical leg, forming the heat engine expansion chamber 708 between the heat engine floating piston 804 and the concentrator wall 802. The heat pump floating piston 706 floats on top of the liquid piston 716 in the other vertical leg, forming the heat pump expansion chamber 712 between the heat pump floating piston 706 and the concentrator wall 802. The heat engine expansion chamber 708 is filled with the heat engine fluid 710. The heat pump expansion chamber 712 is filled with the heat pump fluid 714.

The heat engine floating piston 804 and the heat pump floating piston 706 are constructed to reduce the thermal mass exposed to the heat engine expansion chamber wall 709.

Figure 14:
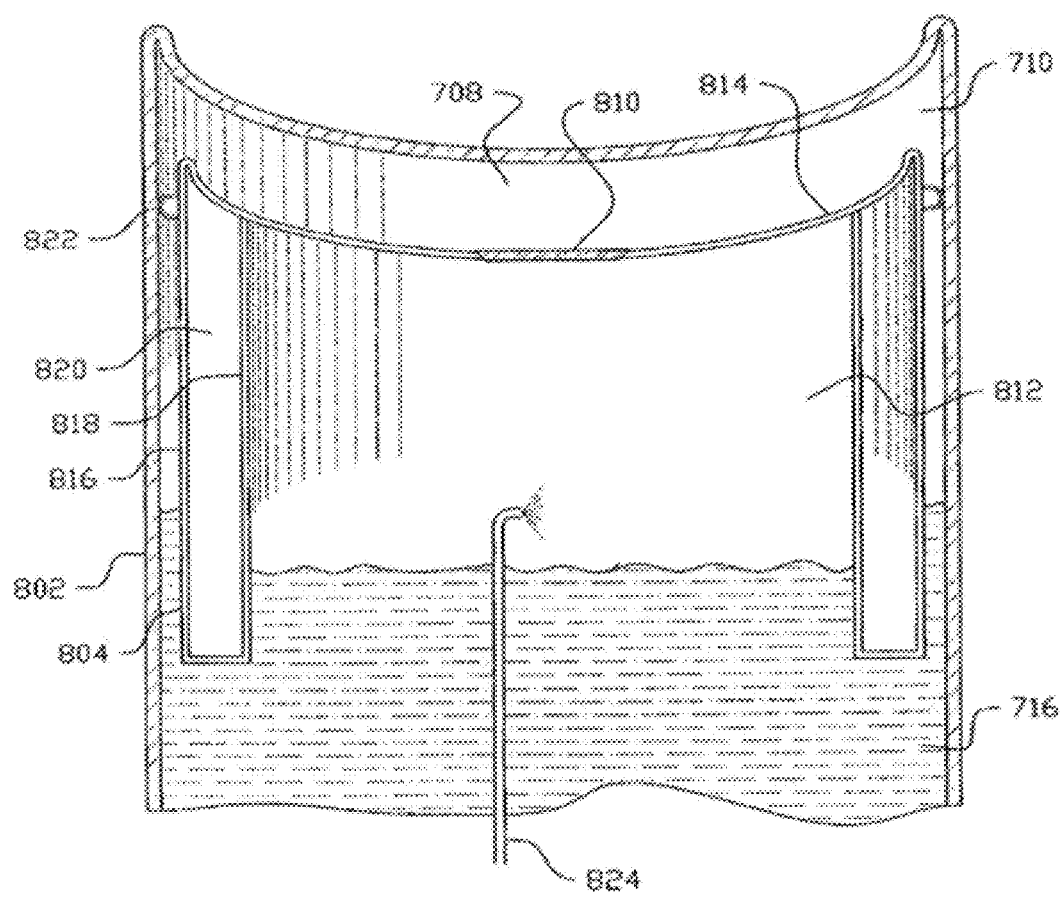
FIG. 14 shows an exemplary heat engine piston for an alternate embodiment.

As shown in FIG. 14, the heat engine floating piston 804 has a piston top member 814, which includes the bottom wall of the heat engine expansion chamber 708. The piston top member 814 is connected to a piston outer wall 816, which is approximately 1 meter tall. In this example, the piston outer wall 816 is formed from rolled and welded aluminum sheet approximately 1.5 mm thick. The piston inner wall 818 is also formed from rolled and welded aluminum sheet approximately 1.5 mm thick. The gap 820 between the piston outer wall 816 and the piston inner wall 818 provides a thermal barrier between the concentrator wall 802 and the part of liquid piston 716 that is inside of the heat engine floating piston 804. The heat engine floating piston 804 is designed and built to provide a small gap, approximately 2 mm, between the outer diameter of the heat engine floating piston 804 and the inner diameter of the concentrator wall 802. A piston seal 822 may be located near the top of the heat engine floating piston 804 to minimize condensation and evaporation effects from the concentrator wall 802.

An exhaust valve 810 may connect the heat engine expansion chamber 708 to a condensation chamber 812. The exhaust valve 810 can be controlled to turn on and off at the appropriate points in the cycle. A spray system 824 may be located in the condensation chamber 812. When the exhaust valve 810 is opened, liquid from liquid piston 716 is sprayed into the condensation chamber 812 to cause condensation of the heat engine fluid 710. Heat is removed from the liquid piston 716 either by using a conventional heat exchanger or by circulating fluid through the liquid piston 716 and cooling the fluid, for example, at night using cooling device 300.

FIG. 9 shows the components that are used in the heat pump cycle. The heat pump expansion chamber 712 is connected to the pressure chamber 550 with the piping system 750 that contains the heat pump pressure valve 752. The pressure chamber 550 is connected to the inlet of the fluid to electric converter 600, which in this example is a 650 kW steam turbine connected to a 650 kW generator. The outlet of fluid to electric converter 600 is connected to a vacuum chamber 560. The vacuum chamber 560 is connected back to heat pump expansion chamber 712 through a piping system that contains a heat pump vacuum valve 754.

The present system 10 discloses a unique combination of a dual loop heat actuated liquid piston heat pump, where the heat can be supplied by a natural source such as solar energy, and where the hot vapor, typically steam, output from the heat pump loop is fed into a steam turbine-generator combination and the lower pressure vapor from the turbine exhaust is fed back into the heat pump.

The present system 10 also discloses a unique natural heat source heat actuated liquid piston heat pump where both the heat engine and the heat pump operate at near atmospheric pressures or below, allowing the apparatus to be constructed below grade or underground using low cost materials, such as concrete which have a high compressive strength, but much lower tensile strength.

The present system also discloses a unique thermodynamic cycle for the heat actuated liquid piston heat pump. The unique cycle, which pertains to the heat engine end of the apparatus, uses a combination of steam and liquid water, and cools both the steam and liquid water during the expansion phase of the cycle.

The thermal and pressure concentration is done at the time of use, not at the time of collection. As a result, the hot thermal storage is at atmospheric pressure or below and the temperature of the thermal storage is much lower than conventional solar concentration systems. This also allows the thermal storage chambers to be constructed using low cost, high compressive strength materials such as concrete. It also allows the use of water as the thermal storage medium.

In one embodiment, the only liquid in the system is water, which is non-hazardous and non-polluting. The solid materials used are also non-hazardous and non-polluting.

Because the concentration is done at the time of use rather than the time of collection, the solar energy can be collected using low cost, low temperature flat plate collectors. These collectors can be manufactured from a combination of low cost plastics, concrete, and standard insulation, all of which can be easily manufactured in large volumes at relatively low cost.

Figure 28:
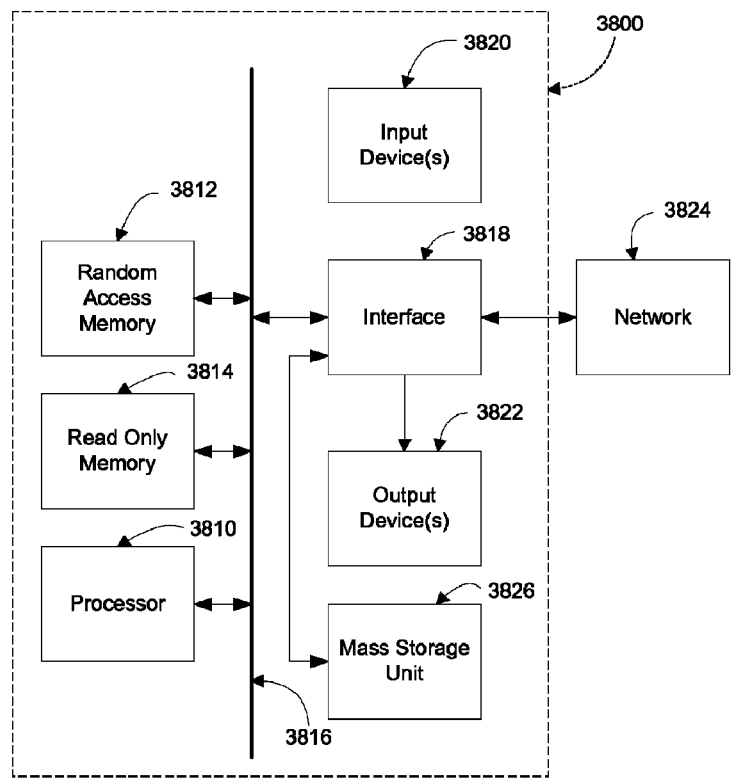
FIG. 28 is a block diagram of an example processor system that may be used to implement portions of the system.

FIG. 28 is a block diagram of an example computer system 3800 capable of implementing the apparatus and methods disclosed herein. The computer system 3800 can be, for example, a server, a personal computer, a personal digital assistant (PDA), or any other type of computing device.

The computer system 3800 of the instant example includes a processor 3810. For example, the processor 3810 can be implemented by one or more Intel.®. microprocessors from the Pentium.®. family, the Itanium.®. family, the XScale.®. family, or the Centrino.®. family. Of course, other processors from other families are also appropriate.

The processor 3810 is in communication with a main memory including a volatile memory 3812 and a non-volatile memory 3814 via a bus 3816. The volatile memory 3812 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3814 may be implemented by flash memory and/or any other desired type of memory device. Access to the main memory 3812, 3814 is typically controlled by a memory controller (not shown) in a conventional manner.

The computer system 3800 also includes a conventional interface circuit 3818. The interface circuit 3818 may be implemented by any type of well known interface standard, such as an Ethernet interface, a universal serial bus (USB), and/or a third generation input/output (3GIO) interface.

One or more input devices 3820 are connected to the interface circuit 3818. The input device(s) 3820 permit a user to enter data and commands into the processor 3810. The input device(s) can be implemented by, for example, a keyboard, a mouse, a touch screen, a track-pad, a trackball, isopoint and/or a voice recognition system.

One or more output devices 3822 are also connected to the interface circuit 3818. The output devices 3822 can be implemented, for example, by display devices (e.g., a liquid crystal display, a cathode ray tube display (CRT), a printer and/or speakers). The interface circuit 3818, thus, typically includes a graphics driver card.

The interface circuit 3818 also includes a communication device such as a modem or network interface card to facilitate exchange of data with external computers via a network 3824 (e.g., an Ethernet connection, a digital subscriber line (DSL), a telephone line, coaxial cable, a cellular telephone system, etc.).

The computer system 3800 also includes one or more mass storage devices 3826 for storing software and data. Examples of such mass storage devices 3826 include floppy disk drives, hard drive disks, compact disk drives and digital versatile disk (DVD) drives.

As an alternative to implementing the methods and/or apparatus described herein in a system such as the device of FIG. 28, the methods and/or apparatus described herein may alternatively be embedded in a structure such as processor and/or an ASIC (application specific integrated circuit).

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. An article of manufacture storing machine readable instructions which, when executed, causes a machine to:
   a. collect thermal energy;
   b. transfer the collected thermal energy to a concentrator, the concentrator comprising a heat engine, a liquid piston, and a heat pump; and
   c. invoke a series of oscillating cycles of the heat engine, the liquid piston, and the heat pump;
   d. the machine controlling the heat engine through at least one of an isothermal expansion phase, an isentropic expansion phase, a constant volume compression phase, and isothermal compression phase, or an isentropic compression phase;
   e. to drive an electrical generating unit operatively connected to the heat pump.

2. An article of manufacture in accordance with claim 1 wherein the machine readable instructions are executed by means of a computing device.

3. An article of manufacture in accordance with claim 2 wherein the computing device comprises at least one of: a server, a personal computer, a personal digital assistant, or an application specific integrated circuit (ASIC).

4. An article of manufacture in accordance with claim 1 wherein at least one inlet valve and one exhaust valve in connection with the heat engine are opened and closed at proper times to apply and remove force from the heat engine piston in phase with the oscillating cycle of the heat engine.

5. An article of manufacture in accordance with claim 4 wherein the inlet valve and the exhaust valve are opened and closed at proper times to cause the machine to oscillate near a resonant frequency.

6. An article of manufacture in accordance with claim 1 wherein at least one of; the isothermal expansion phase, the isentropic expansion phase, the constant volume compression phase, the isothermal compression phase, or the isentropic compression phase operate at or below atmospheric pressure.

7. An article of manufacture in accordance with claim 1 wherein the heat engine further comprises a measurement sensor of determining the position of the heat engine piston.

8. An article of manufacture in accordance with claim 7 wherein the computing device works in concert with the measurement sensor to position of the heat engine piston into a known starting location.

9. An article of manufacture in accordance with claim 1 wherein the machine readable instructions cause the machine to control a heat pump piston through at least one of an isentropic compression phase, an isothermal compression phase, an isentropic expansion phase, or an isothermal expansion phase.

10. An article of manufacture in accordance with claim 9 wherein the machine readable instructions cause the machine to drive the electrical generating unit with a heat pump fluid during at least one of the isothermal compression phase or the isothermal expansion phase.

11. An article of manufacture in accordance with claim 10 wherein the electrical generating unit is a steam turbine.

12. An article of manufacture in accordance with claim 9 wherein at least one of; the isentropic compression phase, the isothermal compression phase, the isentropic expansion phase, or the isothermal expansion phase operate at or below atmospheric pressure.

13. An article of manufacture as defined in claim 1 wherein the machine readable instructions cause the machine to control a heat engine piston during the oscillating cycle of the heat engine, the heat engine piston ascending and descending, the oscillating cycle of the heat pump further comprising a heat pump piston to at least one of descend in response to the heat engine piston ascension and ascend in response to the heat engine piston descension.

14. A process for generating electricity from thermal energy comprising:
   a. providing a concentrator, said concentrator comprising; a heat engine, a liquid piston, and a heat pump and having means for executing machine readable instructions;
   b. acquiring thermal energy;
   c. applying the thermal energy to the heat engine invoking a series of oscillating cycles of the heat engine;
   d. wherein the oscillating cycles of the heat engine further comprise at least one of the steps of; an isothermal expansion, an isentropic expansion, a constant volume condensation, an isothermal compression, or an isentropic compression;
   e. transferring said thermal energy from the heat engine to the heat pump by means of a liquid piston, thereby forming concentrated thermal energy,
   f. driving an electrical generating unit which is operatively connected to the heat pump by transferring the concentrated thermal energy from the heat pump to the electrical generating unit.

15. A process in accordance with claim 14 wherein said thermal energy comprises low grade thermal energy from at least one of: solar collectors, geothermal heat sources, or industrial waste heat sources.

16. A process in accordance with claim 15 wherein the process includes an additional step for storing thermal energy between the steps of collecting the thermal energy and transferring the thermal energy to the concentrator.

17. A process in accordance with claim 15 wherein forming the concentrated thermal energy comprises invoking a series of oscillating cycles of the heat engine, the liquid piston, and the heat pump by means of the application of the low grade thermal energy.

18. A process in accordance with claim 14 wherein the oscillating cycles of the heat pump further comprise at least one of the steps of: an isentropic compression, an isothermal compression, an isentropic expansion, or an isothermal expansion.

19. A process in accordance with claim 18 wherein the operative connection between the heat pump and the electrical generating unit further comprises a heat pump pressure valve and a heat pump vacuum valve, and adding steps for opening and closing the heat pump pressure valve and the heat pump vacuum valve such as to drive the electrical generating unit during at least one of the isothermal compression phase or the isothermal expansion phase.

20. A process in accordance with claim 19 wherein the concentrated thermal energy is in the form of steam.

21. A process in accordance with claim 20 wherein the electrical generating unit is a steam turbine.

22. An article of manufacture having a computing device for storing machine readable instructions and executing those instructions that, when executed, causes a machine to:
   a. collect and store low grade thermal energy,
   b. transfer the low grade thermal energy to an input of a heat engine through at least one inlet valve,
   c. said heat engine comprising a heat engine chamber, a heat engine piston, and being in communication with at least one exhaust valve;
   d. the instructions causing the coordinated operation of at least one inlet valve and one exhaust valve applying the thermal energy to move the heat engine piston in a way that causes the heat engine piston to oscillate;
   e. the heat engine piston being connected with a liquid piston, having the oscillation of the heat engine piston transfer energy to the liquid piston;
   f. a heat pump comprising a heat pump chamber, a heat pump piston, and being in communication with at least one heat pump pressure valve and one heat pump vacuum valve;
   g. said heat pump piston connected with the liquid piston such that the heat pump piston descends in response to the heat engine piston ascension and ascends in response to the heat engine piston descension and in a way that the heat pump piston receives energy from the liquid piston, transforming the low grade thermal energy into concentrated thermal energy; and
   h. driving and electrical generating unit which is operatively connect to the heat pump.

* * * * *